United States Patent [19]
Cartabiano et al.

[11] Patent Number: 5,796,354
[45] Date of Patent: Aug. 18, 1998

[54] HAND-ATTACHABLE CONTROLLER WITH DIRECTION SENSING

[75] Inventors: Michael C. Cartabiano, Hermosa Beach; Kenneth J. Curran, Thousand Oaks, both of Calif.; David J. Dick; Douglas R. Gibbs, both of Longmont, Colo.; Morgan H. Kirby, Arvada, Colo.; Richard L. May, Manhattan Beach, Calif.; William J. A. Storer, Loveland, Colo.; Adam N. Ullman, Boulder, Colo.

[73] Assignee: Reality Quest Corp., Longmont, Colo.

[21] Appl. No.: 797,588

[22] Filed: Feb. 7, 1997

[51] Int. Cl.⁶ .................... H03K 17/94; H03M 11/00
[52] U.S. Cl. .................... 341/22; 341/173; 341/176; 345/157; 364/190; 273/148 B; 463/37
[58] Field of Search .................... 273/198 B, 438; 463/37, 46, 47; 345/156, 157, 158, 184; 364/190, 709.01, 709.02, 709.08, 709.11; 341/20, 173, 176, 21; 340/825.19

[56] References Cited

U.S. PATENT DOCUMENTS

| | | |
|---|---|---|
| 1,335,272 | 3/1920 | Broughton . |
| 3,022,878 | 2/1962 | Seibel et al. . |
| 3,541,541 | 11/1970 | Engelbart . |
| 3,778,058 | 12/1973 | Rausch . |
| 4,302,138 | 11/1981 | Zarudiansky . |
| 4,414,537 | 11/1983 | Grimes . |
| 4,462,594 | 7/1984 | Bromley et al. . |
| 4,488,017 | 12/1984 | Lee . |
| 4,489,316 | 12/1984 | MacQuivey . |
| 4,491,325 | 1/1985 | Bersheim . |
| 4,514,817 | 4/1985 | Pepper et al. . |
| 4,519,097 | 5/1985 | Chappell, Jr. et al. . |
| 4,540,176 | 9/1985 | Baer . |
| 4,542,291 | 9/1985 | Zimmerman . |
| 4,552,360 | 11/1985 | Bromley et al. . |
| 4,558,704 | 12/1985 | Petrofsky . |
| 4,567,479 | 1/1986 | Boyd . |
| 4,586,387 | 5/1986 | Morgan et al. . |
| 4,607,159 | 8/1986 | Goodson et al. . |
| 4,613,139 | 9/1986 | Robinson, II . |
| 4,660,033 | 4/1987 | Brandt . |
| 4,711,543 | 12/1987 | Blair et al. . |
| 4,712,101 | 12/1987 | Culver . |
| 4,715,235 | 12/1987 | Fukui et al. . |

(List continued on next page.)

FOREIGN PATENT DOCUMENTS 1245782  11/1988  Canada .

OTHER PUBLICATIONS

Randy Pausch, Virtual Reality on Five Dollars a Day, Apr. 1991, pp. 1–7.

Fisher et al., Virtual Environment Display System, Oct. 1986, pp.1–11.

Nakano et al., Hitachi's Robot Hand, pp. 18–20. No Date.

Carol Marsha Ginsberg, Human Body Motion as Input to an Animated Graphical Display, May 1983, pp. 1–88.

Jennifer A. Hall, The Human Interface In Three Dimensional Computer Art Space, Oct. 1985, pp. 1–68.

*Primary Examiner*—Michael Horabik
*Assistant Examiner*—Timothy Edwards, Jr.
*Attorney, Agent, or Firm*—Dilworth & Barrese

[57] ABSTRACT

Disclosed is a hand attachment for providing command signals to control movement of at least one object responsive to hand movement. The hand attachment includes a glove base assembly having an upper surface including a palm surface and a finger surface. The finger surface has a plurality of finger pads, each depressible by a finger of a user wearing the hand attachment to cause a specific movement of the object. A glove is attached to the glove base assembly such that at least a portion of the glove overlays the palm surface. At least one sensing device detects directional movement of a user's hand relative to the user's arm. Electronics within the glove base assembly convert the detected directional movement to command signals for controlling the movement of the object in directions corresponding to the movement.

20 Claims, 23 Drawing Sheets

U.S. PATENT DOCUMENTS

| | | |
|---|---|---|
| 4,721,308 | 1/1988 | Trimble . |
| 4,722,625 | 2/1988 | O'Brien . |
| 4,738,417 | 4/1988 | Wenger . |
| 4,754,268 | 6/1988 | Mori . |
| 4,823,634 | 4/1989 | Culver . |
| 4,824,111 | 4/1989 | Hoye et al. . |
| 4,839,838 | 6/1989 | LaBiche et al. . |
| 4,849,732 | 7/1989 | Dolenc . |
| 4,862,165 | 8/1989 | Gart . |
| 4,897,649 | 1/1990 | Stucki . |
| 4,905,001 | 2/1990 | Penner . |
| 4,927,987 | 5/1990 | Kirchgessner . |
| 4,954,817 | 9/1990 | Levine . |
| 4,982,618 | 1/1991 | Culver . |
| 4,988,981 | 1/1991 | Zimmerman et al. . |
| 5,038,144 | 8/1991 | Kaye . |
| 5,046,739 | 9/1991 | Reichow . |
| 5,047,952 | 9/1991 | Kramer et al. . |
| 5,059,958 | 10/1991 | Jacobs et al. . |
| 5,068,645 | 11/1991 | Drumm . |
| 5,097,252 | 3/1992 | Harvill et al. . |
| 5,151,553 | 9/1992 | Suzuki et al. . |
| 5,175,534 | 12/1992 | Thatcher . |
| 5,184,319 | 2/1993 | Kramer . |
| 5,212,372 | 5/1993 | Quick et al. . |
| 5,228,356 | 7/1993 | Chuang . |
| 5,229,756 | 7/1993 | Kosugi et al. . |
| 5,244,066 | 9/1993 | Mackoway et al. . |
| 5,252,970 | 10/1993 | Baronowsky . |
| 5,283,555 | 2/1994 | Ward et al. . |
| 5,288,078 | 2/1994 | Capper et al. . |
| 5,296,871 | 3/1994 | Paley . |
| 5,298,919 | 3/1994 | Chang . |
| 5,323,174 | 6/1994 | Klapman et al. . |
| 5,329,276 | 7/1994 | Hirabayashi . |
| 5,349,881 | 9/1994 | Olorenshaw et al. . |
| 5,355,146 | 10/1994 | Chiu et al. . |
| 5,355,147 | 10/1994 | Lear . |
| 5,363,120 | 11/1994 | Drumm . |
| 5,379,663 | 1/1995 | Hara . |
| 5,384,460 | 1/1995 | Tseng . |
| 5,410,332 | 4/1995 | Barry et al. . |
| 5,423,554 | 6/1995 | Davis . |
| 5,440,326 | 8/1995 | Quinn . |
| 5,444,462 | 8/1995 | Wambach . |
| 5,453,759 | 9/1995 | Seebach . |
| 5,459,312 | 10/1995 | Gurner et al. . |
| 5,481,263 | 1/1996 | Choi . |
| 5,485,171 | 1/1996 | Copper et al. . |
| 5,486,112 | 1/1996 | Troudet et al. . |
| 5,488,362 | 1/1996 | Ullman et al. . |
| 5,489,922 | 2/1996 | Zloof . |
| 5,493,314 | 2/1996 | Rowe . |
| 5,503,040 | 4/1996 | Wright . |
| 5,512,919 | 4/1996 | Araki . |
| 5,526,022 | 6/1996 | Donahue et al. . |
| 5,555,894 | 9/1996 | Doyama et al. . |
| 5,558,329 | 9/1996 | Liu . |
| 5,563,628 | 10/1996 | Stroop . |
| 5,565,861 | 10/1996 | Mettler et al. . |
| 5,568,928 | 10/1996 | Munson et al. . |
| 5,571,020 | 11/1996 | Troudet . |
| 5,572,238 | 11/1996 | Krivacic . |
| 5,581,276 | 12/1996 | Cipolla et al. . |
| 5,583,478 | 12/1996 | Renzi . |

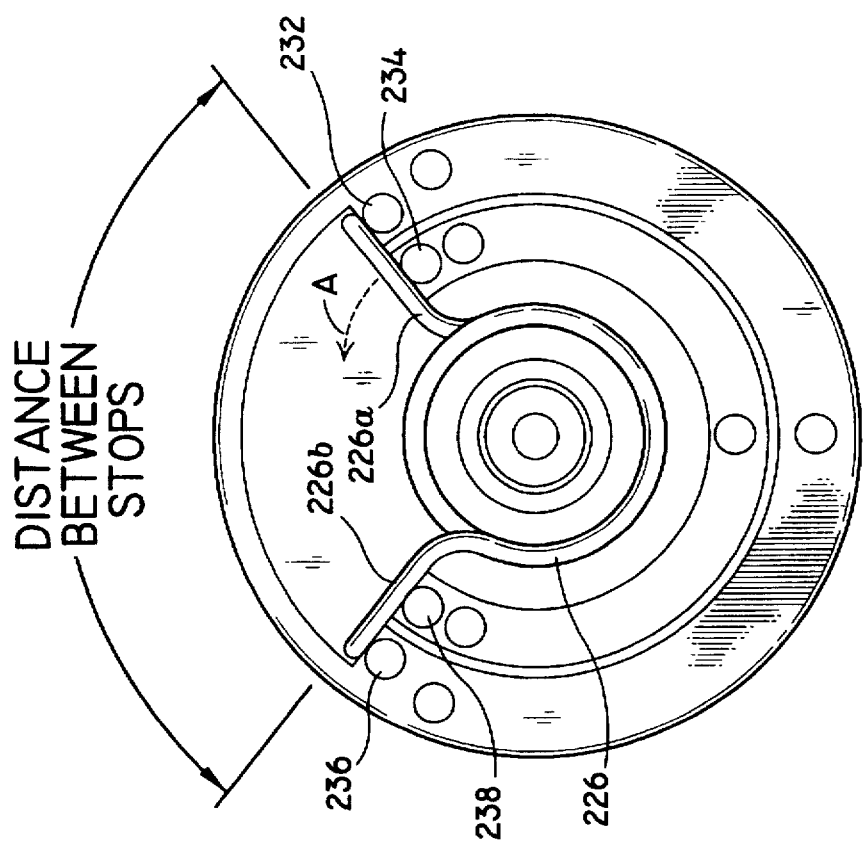
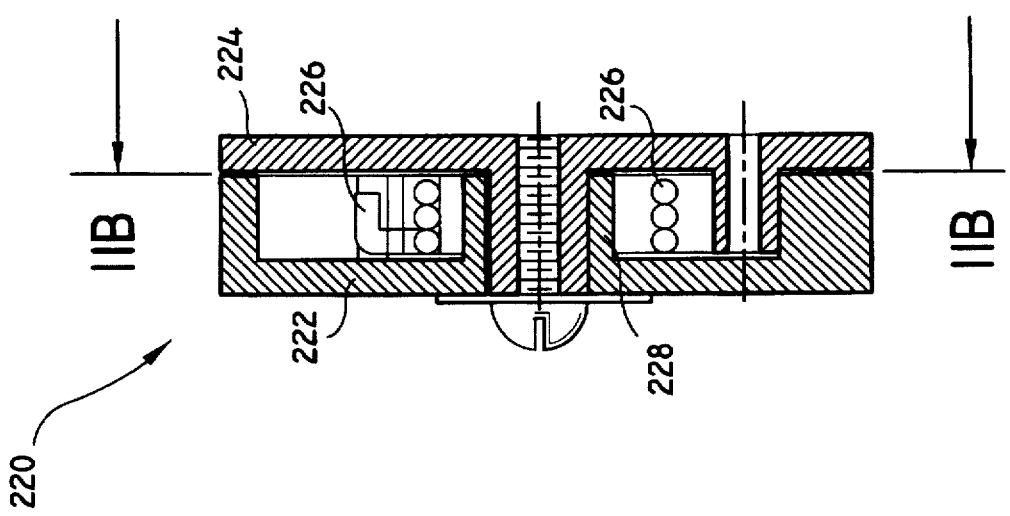
FIG. 11B
FIG. 11A

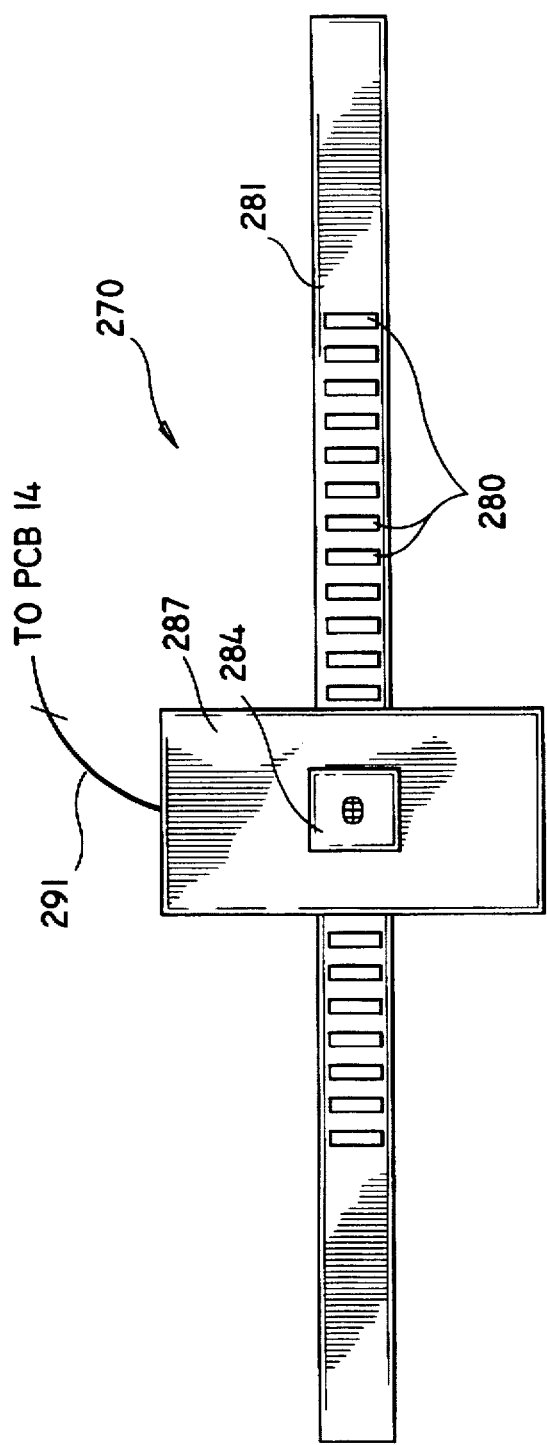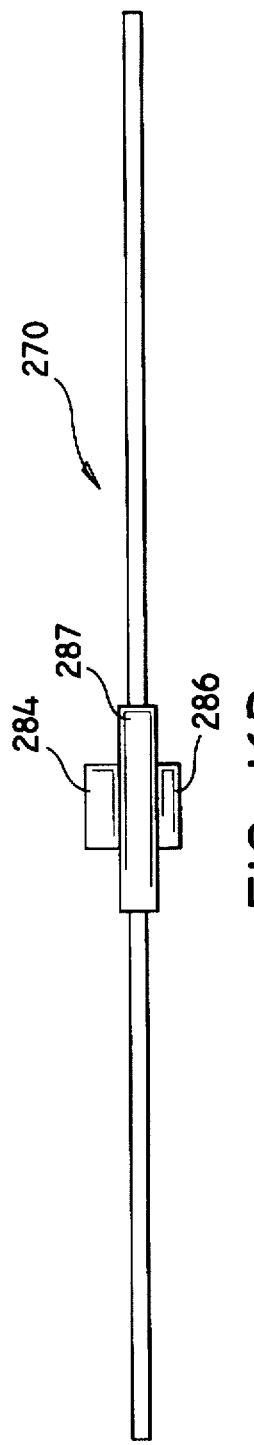
FIG. 16A
FIG. 16B

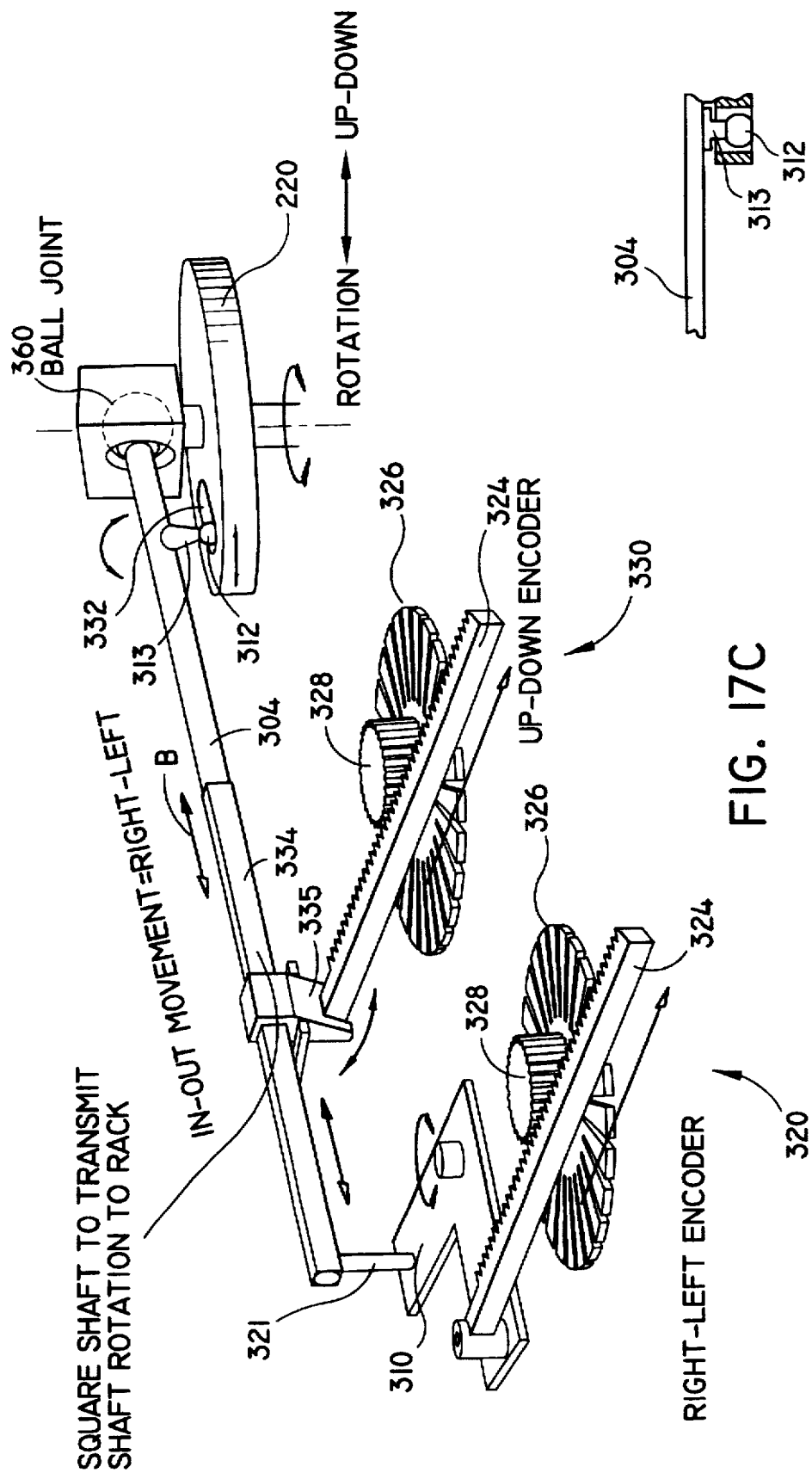

5,796,354

HAND-ATTACHABLE CONTROLLER WITH DIRECTION SENSING

TECHNICAL FIELD

The present invention relates generally to a hand-attachable controller with direction sensing electronics for sensing a directional movement of the hand and commanding a corresponding movement of an object remote from the controller, such as movement of a video element or character on a video display.

BACKGROUND

With the proliferation of computers and game stations that interface with a television, video games that are played on a computer or television screen have enjoyed increasing popularity in recent years. The conventional interface between the user and the game station is typically a joystick or game pad that has a number of control pads or buttons which, when depressed, result in specific movement or action of video characters on the display. For computer games, the interface is typically the computer keyboard, joystick or computer mouse. As such, one limitation of the conventional user interface is the lack of "virtual reality" capability to enable physical movement of a user to be translated to corresponding movement of a video character.

One solution to this problem is proposed in U.S. Pat. No. 5,488,362 to Ullman et al., entitled APPARATUS FOR CONTROLLING A VIDEO GAME, and assigned to the assignee herein. That patent discloses a hand attachment which has a number of detectors disposed at spaced apart locations of the hand attachment. Each detector detects a specific directional movement of a user's hand relative to the user's arm, such as left/right or up/down. The detected movement is converted to command signals which control the movement of at least one video element on a video display in directions corresponding to the hand movement. The hand attachment may also include a conductive contact on each finger and on the thumb. Bringing the thumb contact into contact with any of the other finger contacts results in a specific action of a video character such as firing a weapon or jumping.

Copending U.S. patent application, Ser. No. 08/593,216, entitled HAND MOVEMENT SENSING MECHANISM FOR VIDEO CONTROL, assigned to the assignee herein, the subject matter of which is incorporated herein by reference, discloses a hand attachment with typically two optical sensors having encoder wheels. One sensor senses a user's wrist motion in the horizontal plane while the other senses motion in the vertical plane. The wrist movement is then translated to movement of a character on a video display. Also disclosed is a flex circuit to facilitate connection of finger contacts to processing circuitry commanding video character movement in response to electrical connection of a thumb contact with another finger contact.

Other hand attachments or gloves are also in the prior art. In one hand attachment known as the DATAglove, fiber optic cables line each glove finger, such that movement of a finger changes the amount of light flowing through the fiber optic cables. A computer interface monitors the change in light intensity and compares it to the prior light intensity to determine how the finger moved. Spatial position and orientation is determined by a magnetic sensor. Another hand attachment is known as the NINTENDO POWERglove, which recognizes movement of the fingers by detecting fluctuations in current through conductive ink located in the glove fingers. The spatial position and orientation of the POWERglove is monitored using ultrasonics. A drawback of these attachments is that the use of a "fire" button interferes with their operation, since the fingers are moved, thereby generating unwanted control signals for the video game.

Hand-attachable controllers that control movement of objects in correspondence with hand movement could be widely used in a multiplicity of other applications aside from video games. Examples include controllers for industrial equipment, medical instruments, robotics, and a wireless mouse for computers and for "Web-TV".

SUMMARY OF THE INVENTION

In a preferred embodiment of the present invention, a hand attachment provides command signals to control movement of at least one object such as a video element on a display, in response to hand movement. The hand attachment includes a glove base assembly having an upper surface including a palm surface and a finger surface. The finger surface has a plurality of finger pads, each depressible by a finger of a user wearing the hand attachment to cause a specific movement of the object. A glove is attached to the glove base assembly such that at least a portion of the glove overlays the palm surface. At least one sensing device detects directional movement of a user's hand relative to the user's arm. Electronics within the glove base assembly convert the detected directional movement to command signals for controlling the movement of the object in directions corresponding to the movement.

Advantageously, the ergonomic construction of the hand attachment, particularly, the relation of the glove to the glove base assembly, facilitates a user's access of the finger pads, and allows for their depression independently of hand motion. As such, the hand attachment provides the user with superior object control capability.

Preferably, the hand attachment is also provided with thumb pads on the glove base assembly which may be used to either control supplemental directional movement of the object, or to control specific functions. In addition, automatic centering circuitry is included for allowing the user to establish a neutral position from which all control directions emanate, such as via depression of a button on the hand attachment. A mode switch may also be included which allows the sensitivity of the object movement as a function of hand movement to be varied, by allowing a widening or tightening of the neutral zone.

In another embodiment, a hand-attachable controller includes a pair of encoders within a single housing, where each encoder is dedicated for sensing hand movement relative to the forearm in one of two orthogonal planes. Each encoder may comprise an optical encoder wheel rotated by means of a rack engaging a pinion affixed centrally to the wheel.

BRIEF DESCRIPTION OF THE DRAWINGS

For a better understanding of the present invention, reference is had to exemplary embodiments thereof, considered in conjunction with the accompanying drawings in which like reference numerals depict similar or identical elements, wherein:

FIGS. 10A–10C, 11A–11B and 12A–12C are views of various embodiments of a resistive device with center bias, with resistance emanating in all directions out from center position;

FIGS. 16A and 16B are views of an exemplary linear encoder assembly;

FIGS. 17A–17D are views of another embodiment of hand-attachable controller including a pair of encoders within a single housing;

DETAILED DESCRIPTION OF THE PREFERRED EMBODIMENTS

A preferred embodiment of the present invention will be described below as a hand-attachable controller for manipulating characters on video screens, such as in video games and the like. However, it should be understood that the invention is not so limited, and may be adapted for use in a variety of applications, such as a replacement for a computer mouse, as a controller for industrial equipment, medical devices, remote control airplanes, and so forth.

Figure 1:
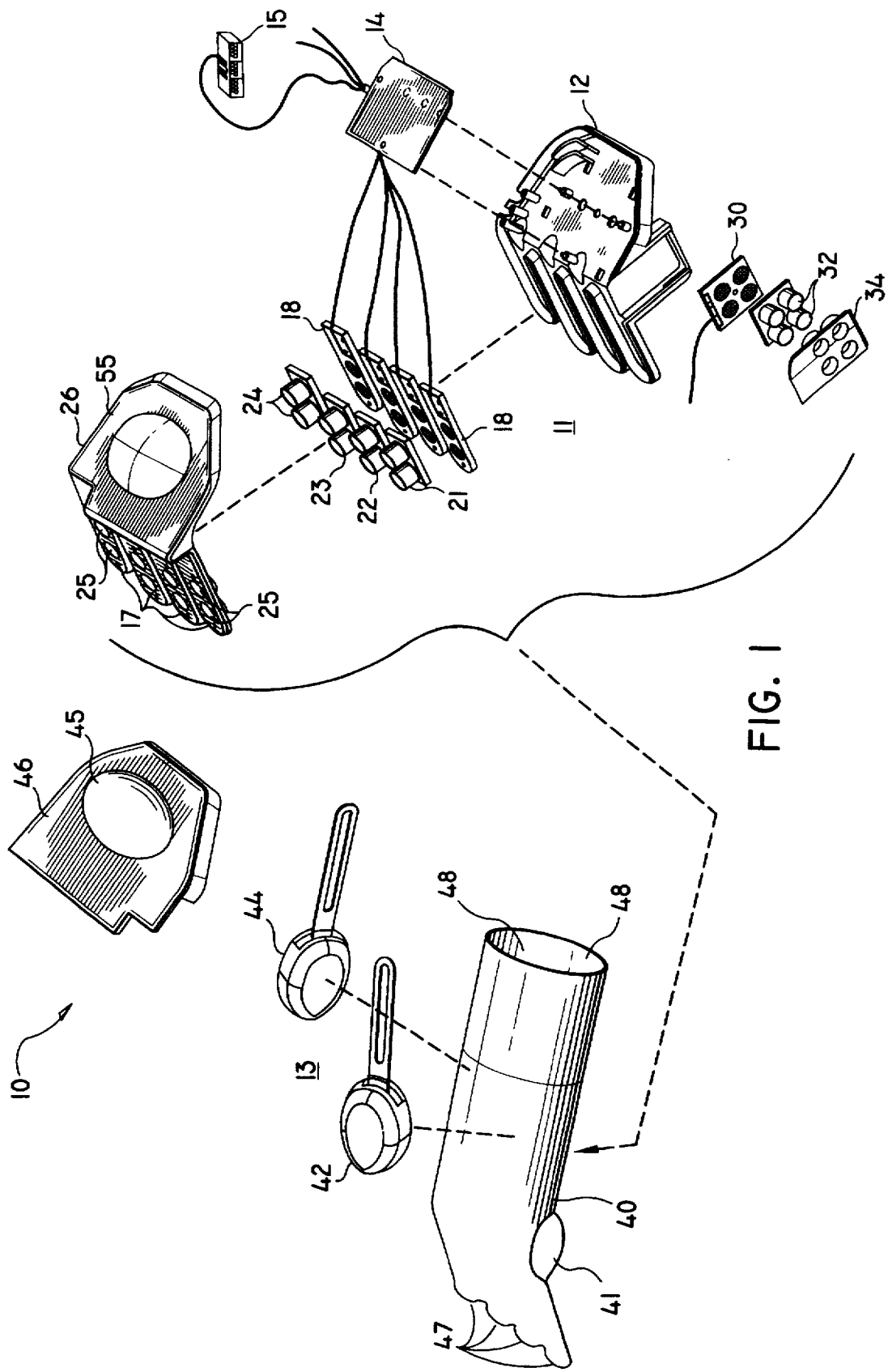
FIG. 1 is an exploded view of a preferred embodiment of a hand attachment in accordance with the present invention.

FIG. 1 is an exploded view of a hand attachment 10, which is an exemplary embodiment of the present invention. Hand attachment 10 includes a glove assembly 13 which is attached to a glove base assembly portion 11. Glove assembly 13 includes a fabric glove 40, e.g., composed of a microfiber material, a glove base support 46 and sensor assemblies 42, 44. The sensor assemblies house electronics for detecting horizontal and vertical movement of a user's wrist to enable corresponding character movement to be produced on a video display. Glove base support 46 is fastened within glove 40 and functions to support the user's palm. Glove 40 includes an aperture 48 through which a user inserts his/her hand, an opening 41 to allow the user's thumb to protrude and four openings 47 through which the user's other fingers extend. As such, glove 40 is preferably a finger-less or cut-off glove. Following the assembly of the various components to form glove base assembly 11, glove 40 is attached to glove assembly 11. For example, glove base 46 may be fastened to top assembly housing 26 via standoffs that extend from glove base 46 through holes in the glove fabric and fasten into housing 26, compressing the glove fabric in between.

Figure 2:
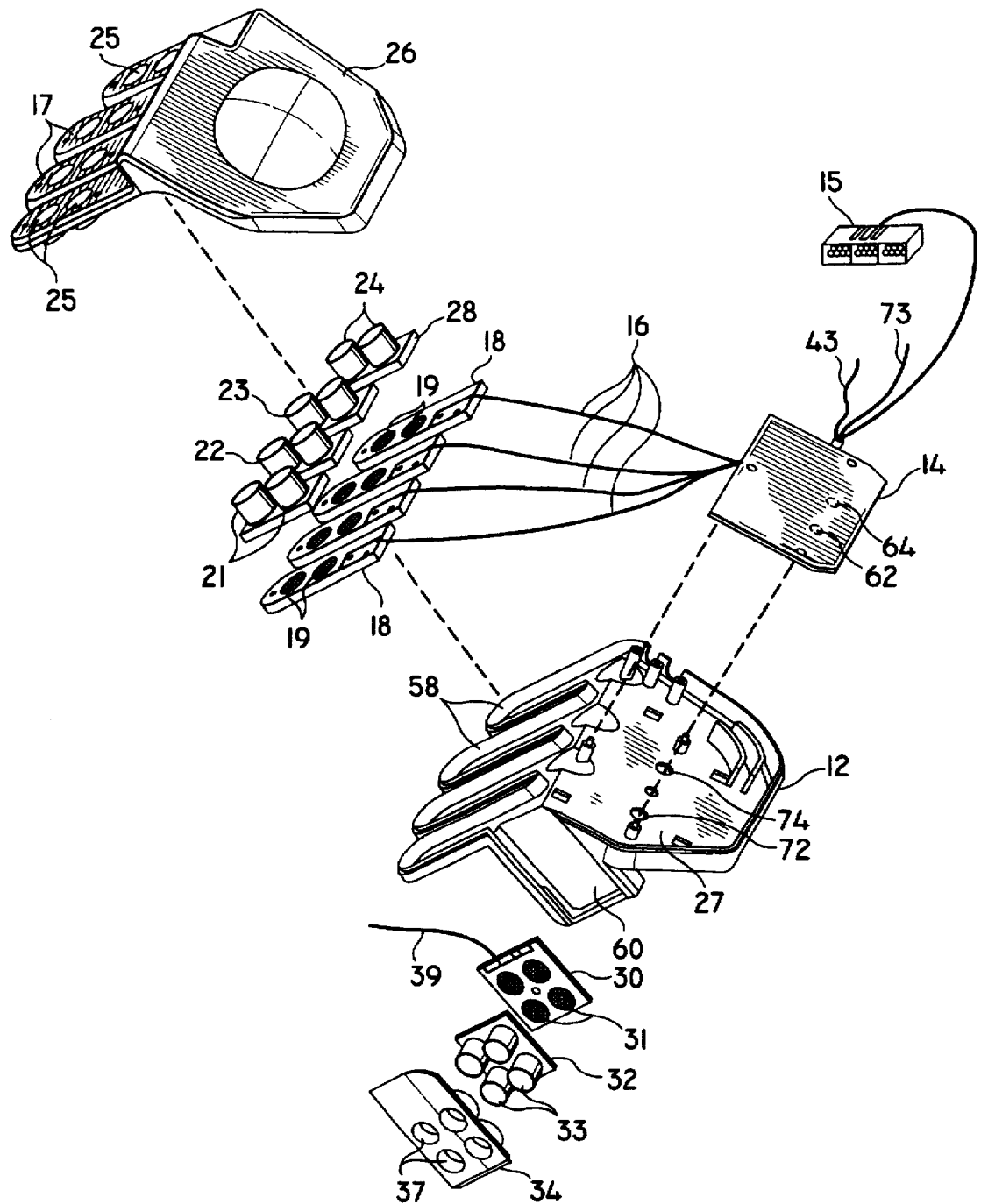
FIG. 2 is an exploded view of a glove base assembly portion of the hand attachment.

FIG. 2 is an exploded view of the glove base assembly portion 11 of hand attachment 10. Four finger boards 18 and a "thumb" printed circuit board (PCB) 30 are mounted in respective slots 58, 60 of a bottom glove base 12. A main printed circuit board 14 is also assembled to bottom glove base 12 and is electrically connected to each of finger boards 18 via finger board wires 16, and to thumb board 30 via thumb board wires 39. Main PCB 14 includes processing and control circuitry to implement a host of functions to be described below. Main PCB 14 is also connected to each of sensor assemblies 42, 44 via respective cables 43 and 73, and to an electrical connector 15. Connector 15 interfaces with a computer or game station (not shown) that interfaces with a display. For example, connector 15 may be configured to connect to the Sony Playstation™ or similar game stations that interface with a television, whereby hand attachment 10 would operate as a replacement for conventional control pads used with such game stations. If hand attachment 10 is used in conjunction with a personal computer, connector 15 may be adapted to plug into the conventional mouse port of the computer whereby hand attachment 10 would replace the mouse.

Finger pads or buttons 21–24 are assembled to finger boards 18 atop corresponding switch contacts 19 of the finger boards. Likewise, thumb pads or buttons 33 are attached to thumb board 30 over corresponding switch contacts 31 on the thumb board. Depression of any one of the finger pads 18 or thumb pads 32 by the user actuates the associated switch 19 or 31. This results in a specific action of a video character or element associated with the finger or thumb pad, such as jumping, ducking, shooting, and so on. To facilitate depression of the finger pads and thumb pads, slots 58 and 60 are disposed at approximately right angles to one another such that the thumb pads are substantially orthogonal to the finger pads. The orientation could be varied to provide the optimum comfort to the user. In the exemplary embodiment, two finger pads such as 21 integral with a pad base 28 (e.g., elastomer switches) are used in conjunction with each finger board; however, it is understood that a single pad or more than two pads 21 could alternatively be employed with corresponding switch contacts on each board 18. Similarly, four thumb pads 33 are shown mounted to thumb board 30 using a thumb pad base 32, but the number of thumb pads may be varied according to the application.

Top glove base assembly 26 includes four finger members 17, each having one or more apertures 25 through which finger pads 21–24 protrude when the top assembly 26 is fastened to bottom assembly 12. Similarly, a thumb cover 34 includes four apertures 37 through which thumb pads 33 protrude.

Figure 3:
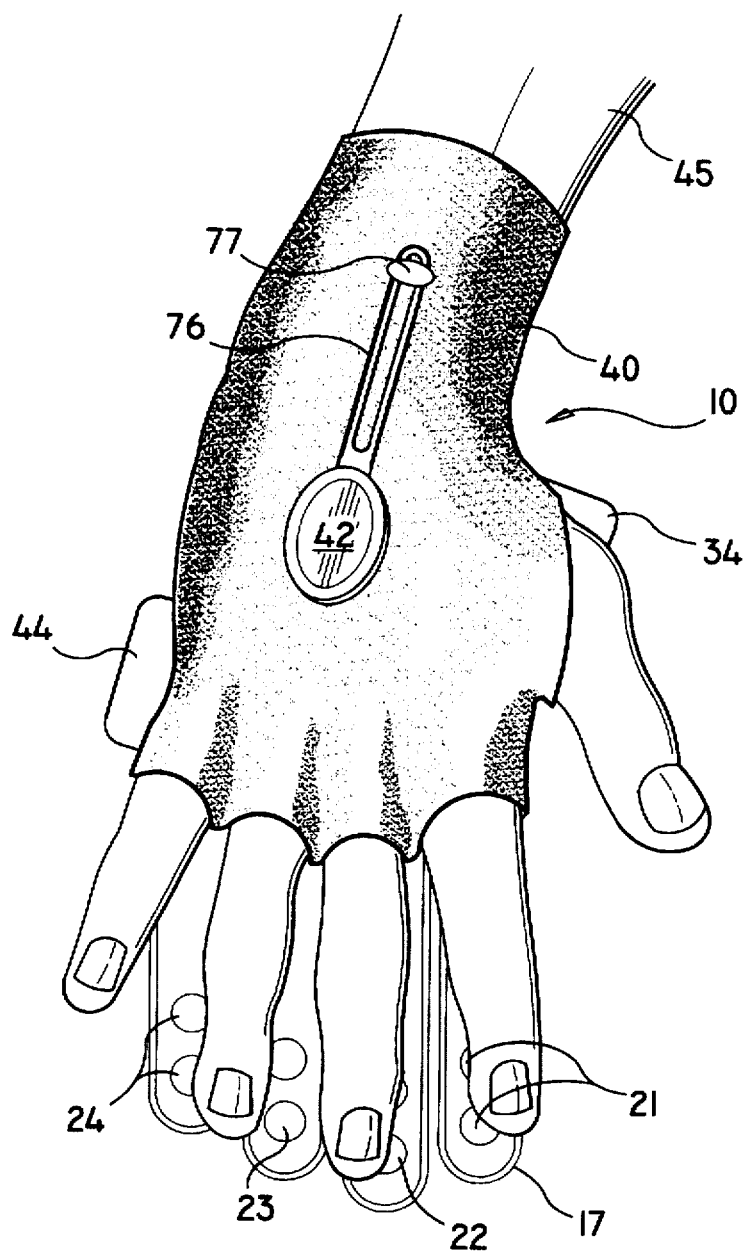
FIG. 3 illustrates the hand attachment as worn by a user.

FIG. 3 illustrates controller assembly 10 with a user's hand fully inserted within glove 40, as during normal use of controller 10. The spacing and dimensions of the finger members 17 and of thumb plate 34 are designed to mirror a typical user's fingers to facilitate depression of buttons 21–24 and 32. The finger-less design of glove 40 allows for comfortable use during game play or other operation of controller 10. However, as an alternative, glove 40 could be designed as a complete glove which fits over the fingers and thumb, or as a strap or straps over the back of the hand. Other alternatives to the finger-less glove include a hand strap, wrist cuff strap, hybrid hand/wrist strap or hybrid glove/strap.

Sensor assembly 42 resides atop the user's wrist and houses electronics that are responsive to left/right (horizontal) motion of the wrist to cause a video element to correspondingly move left or right. Similarly, the electronics within sensor assembly 44 are responsive to vertical motion of the wrist to correspondingly cause vertical motion of the video element. Each sensor assembly includes a paddle arm 76 having an elongated slot in which a capstan-shaped support 77 can be inserted. Support 77 is fastened either to the glove 40 fabric or a support flange mounted to the inner surface of glove 40. As such, support 77 retains the end portion of paddle arm 76 while permitting pivotal motion of the paddle arm. Paddle arm 76 slides with respect to support 77 when wrist motion is in the plane perpendicular to the paddle arm face. For example, top-mounted paddle arm 76 associated with sensor 42 will slide with respect to support 77 with up/down motion in the shown hand orientation. Support 77 may also be slidably adjustable to allow the user to slide it to a comfortable position of the paddle arm.

It is noted that in FIG. 3, sensor assemblies 42 and 44 are shown exposed for illustrative purposes. However, additional glove fabric (not shown) may be used surrounding each of the sensor assemblies to prevent their exposure, which additional fabric is sewn or otherwise attached to the fabric glove 40.

Figure 4:
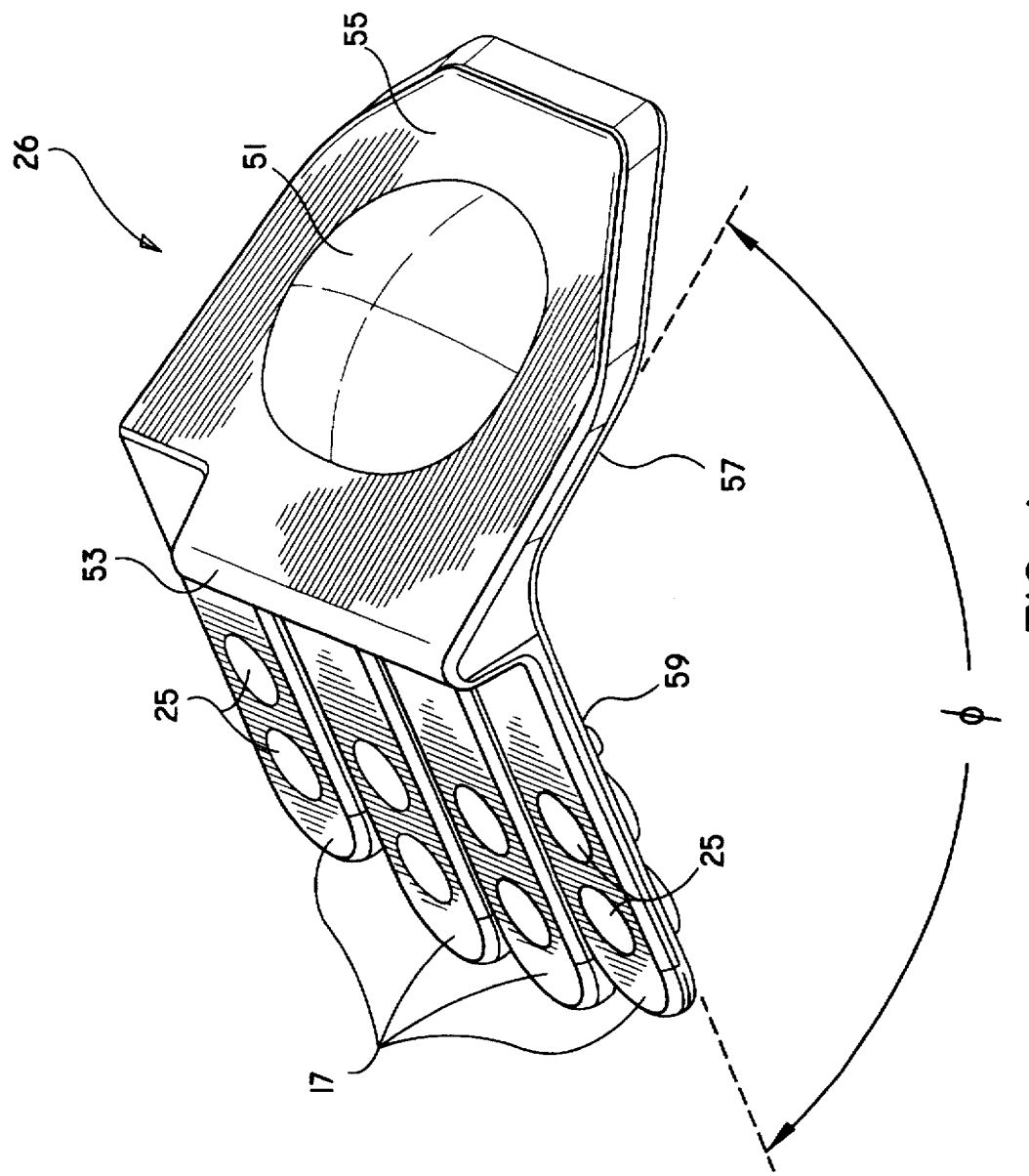
FIG. 4 is a perspective view of a top glove base of the hand attachment.

Referring now to FIG. 4, the upper glove base 26 is shown in greater detail. A "palm" surface 55 includes a centralized dome 51 which enhances support of a user's palm. An angle φ defined by the intersection of finger members 17 and the planar portion of palm surface 55 is designed in the range of about 100 to 140 degrees, and preferably about 120 degrees, to provide for superior ergonomic design. A ridge 53 extends across a region corresponding to the user's index, middle and ring fingers. The resulting notch created in the pinky region functions to facilitate access of finger pads by the user's pinky. In addition, ridge 53 elevates the fingers above finger buttons 21–24, which allows the user to more easily access the finger buttons. As a result, ridge 53 allows for a wider range of hand sizes to operate finger buttons 21–24.

Figure 5:
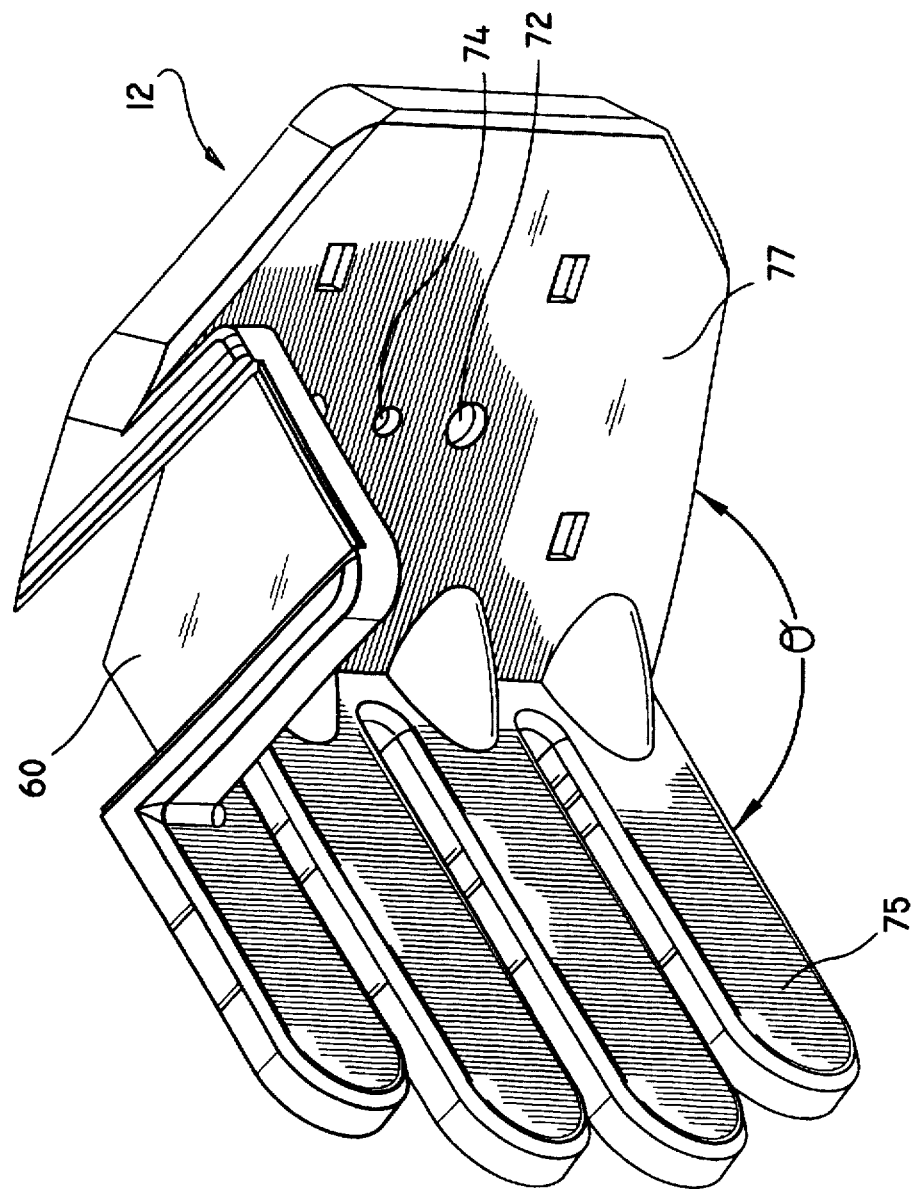
FIG. 5 is a perspective view of a bottom glove base of the hand attachment.

FIG. 5 shows a perspective view of the bottom glove base 12. Inner planar surfaces 75 and 77 define an angle θ in the range of about 100 to 140 degrees. Apertures 72 and 74 are present to accommodate a "mode" button or lever and an automatic centering button (both not shown) which, when depressed or placed in a specific position by a user, activate respective switch contacts 62 and 64 on the main PCB 14 (see FIG. 2). Operation of the mode and centering switches will be described below in connection with FIG. 9.

Figure 6A:
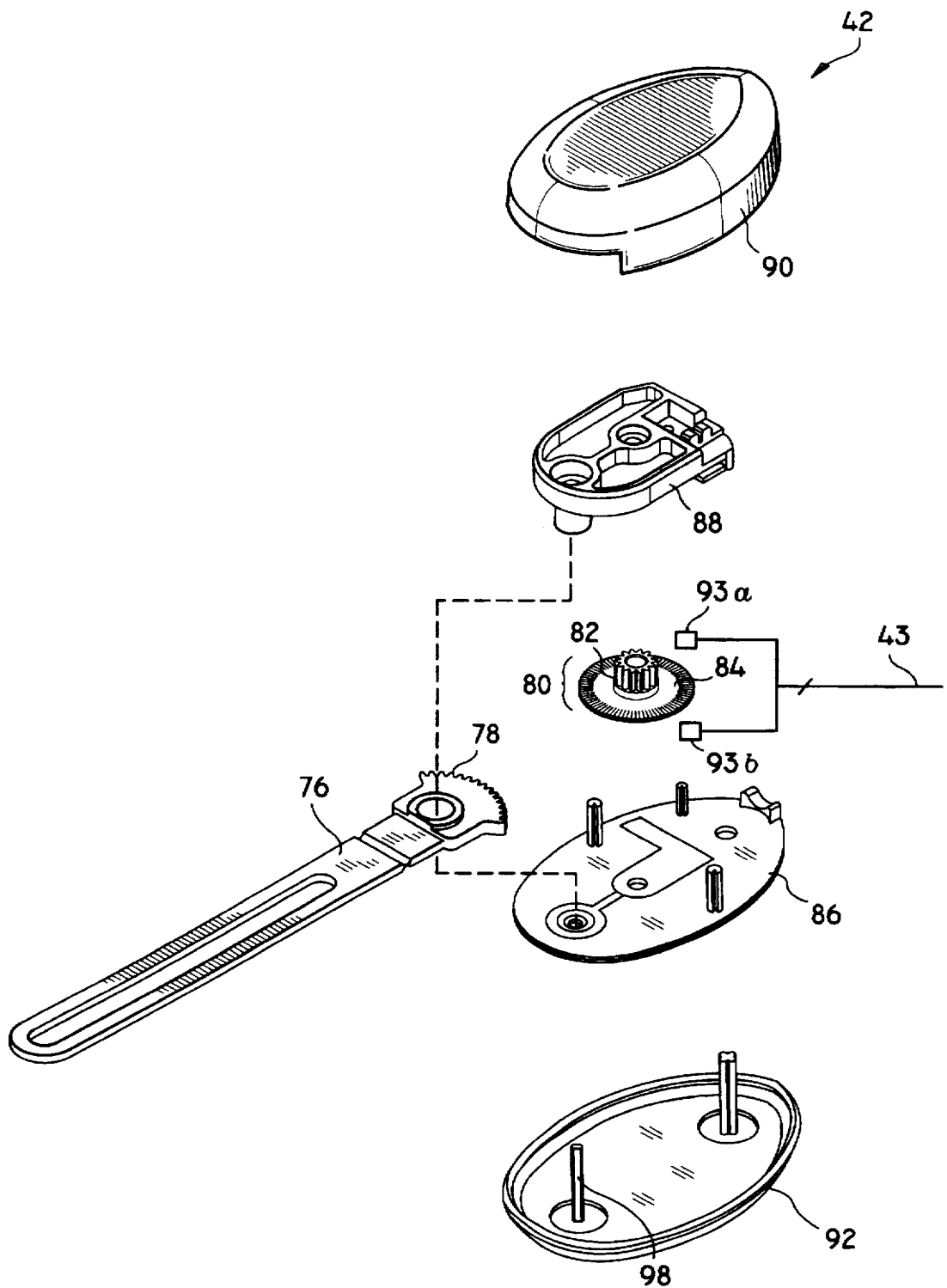
FIG. 6A is an exploded view of an exemplary sensor assembly.

With reference now to FIG. 6A, an embodiment of sensor assembly 42 or 44 is shown in an exploded view. An encoder wheel 80 has peripheral apertures or slots 84 which allow selective passage of light when a light source is directly over the aperture. (Encoder wheel 80 is also shown in plan and top views in FIGS. 8A and 8B, respectively). Housing 93a includes a light source such as an LED which is excited by a voltage supplied on a pair of lines 43. Housing 93b includes a pair of phototransistors biased by voltage on one of lines 43. When encoder wheel 80 is rotated, the light from the LED is alternately blocked and passed by the apertures 84 and the spacing therebetween. As such, each phototransistor within housing 93b receives a train of light pulses and provides corresponding electrical pulses on lines 43 towards a processor on printed circuit board 14. Housing 88 provides a means of attaching, and properly orienting, items 80, 93a, 93b and 78. Housing 88 maintains proper orientation of these components as encoder wheel 80 rotates.

Figure 6B:
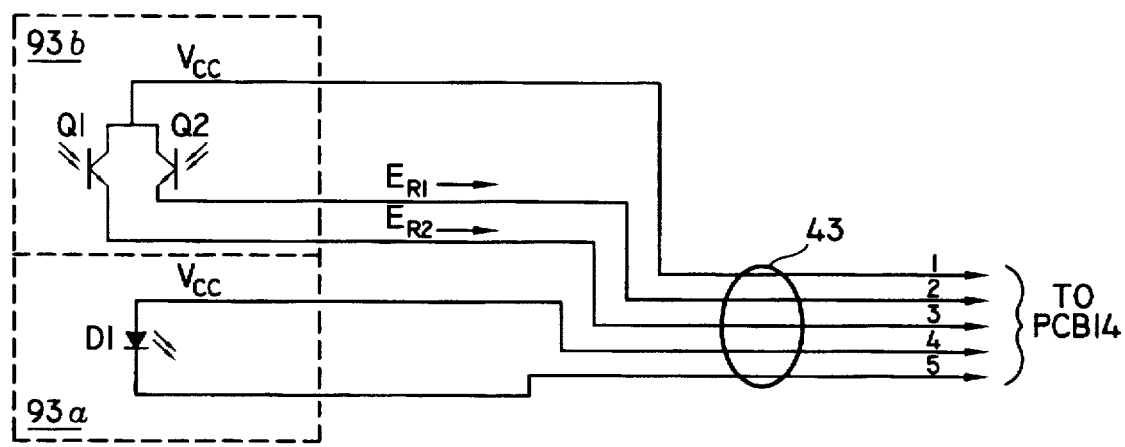
FIG. 6B is a schematic diagram illustrating an LED and dual phototransistor operating in conjunction with an encoder wheel.
Figure 6C:
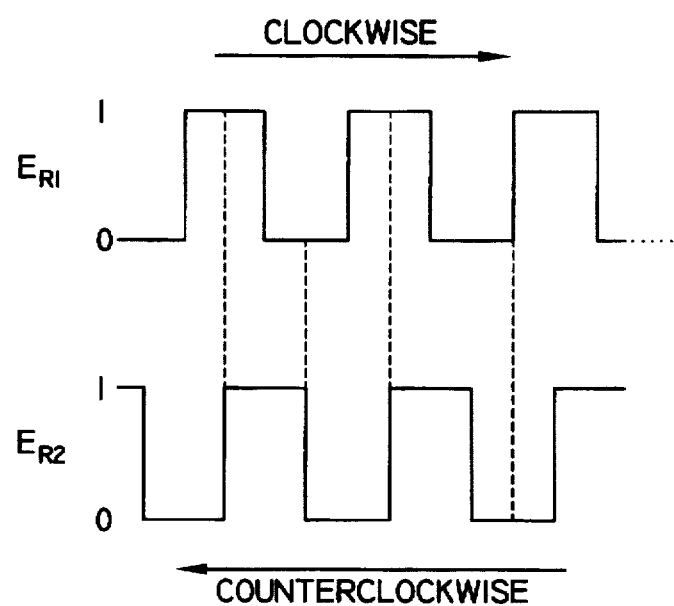
FIG. 6C illustrates voltage waveforms of a quadrature encoding scheme.

As shown schematically in FIG. 6B, LED D1 is excited by voltage $V_{cc}$. Phototransistors Q1 and Q2 are biased by $V_{cc}$ and provide respective voltages $E_{R1}$ and $E_{R2}$ back to PCB 14, which voltages are a function of the amount of light received. By offsetting the phototransistors along the encoder wheel periphery, the phases of the pulsed waveforms produced by the two phototransistors Q1 and Q2 can be compared to determine whether the rotation is clockwise or counterclockwise. This is illustrated in FIG. 6C, which shows waveforms $E_{R1}$ and $E_{R2}$ when the phototransistors are arranged in a quadrature encoding scheme. In this case, phototransistors Q1 and Q2 are positioned one half of an aperture 84 away from one another. As such, when transistor Q1 is at the center of any given aperture, Q2 is at the edge of that aperture (and vice versa) while LED D1 is aligned with the aperture. Each transistor produces a voltage corresponding to a logic "1" when sufficient light is received and a voltage corresponding to logic "0" when insufficient light is received. When encoder wheel 80 is rotated clockwise, a logic 1 of $E_{R1}$ will fall to logic 0 while $E_{R2}$ is still at logic 1. For counterclockwise rotation, $E_{R1}$ will rise from 0 to 1 while $E_{R2}$ is still at logic 0. The processor on PCB 14 can thus decode $E_{R1}$ and $E_{R2}$ using a simple algorithm to determine the direction and amount of encoder wheel 80 rotation.

Figure 8A:
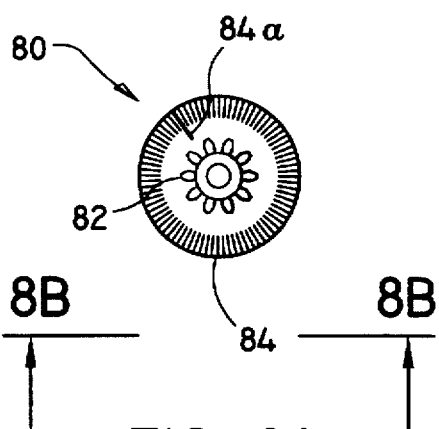
FIGS. 8A and 8B are plan and side views, respectively, of an encoder wheel of the sensor assembly.
Figure 8B:
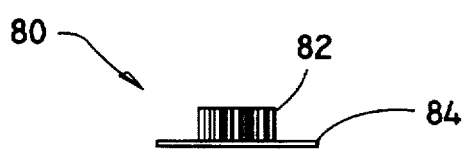

As shown in FIG. 8A, one of the apertures, 84a, may be elongated to facilitate a determination of the exact encoder wheel position. An additional photodetector (not shown) is disposed adjacent the slot 84a, toward the center of the encoder wheel. This photodetector receives sufficient light to correspond to a logic high only when it is aligned with slot 84a. As such, the additional photodetector functions as a "zeroing" photodetector, to enable the processor within the hand attachment to determine the exact relative orientation of the user's forearm relative to the hand. The zeroing photodetector can be employed in both sensor assemblies 42, 44.

Encoder wheel 80 is rotated by means of inner gears 82 engaging gears 78 of a paddle wheel arm 76. When paddle wheel arm 76 is oriented on top of a user's wrist and aligned with the arm as in FIG. 2, (i.e., with the palm face parallel to the ground) horizontal motion of the wrist produces rotation of encoder wheel 80 by engagement with teeth 78, which remain stationary. Likewise, when the sensor assembly is mounted on the side of the user's wrist, vertical wrist motion causes rotation of the encoder wheel 80. In typical use, however, the hand is held in a handshake position, i.e., perpendicular to the orientation shown in FIG. 3. In the handshake position, vertical movement of the hand produces rotation of the encoder wheel 80 in sensor 42 while horizontal movement rotates the encoder wheel of sensor 44. As such, either sensor can be arranged to measure either up/down or horizontal motion. In addition, software can be manipulated to have options of reversing the direction settings, as well as reversing up with down and left with right.

Figure 7A:
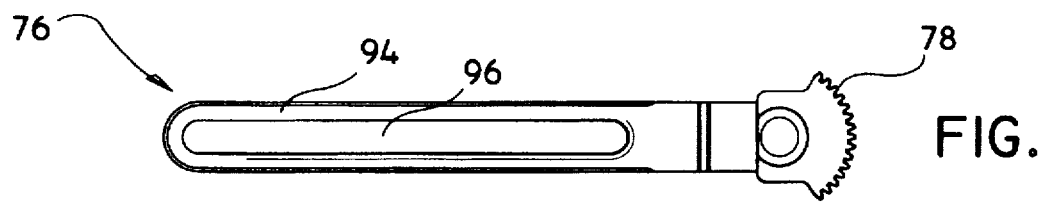
FIGS. 7A and 7B are plan and side views, respectively, of a paddle arm of the sensor assembly.
Figure 7B:

Referring to FIGS. 7A and 7B, paddle arm 76 has an elongated portion 94 with a slot 96, and a notched section 98. Slidable, capstan-shaped support 77 (see FIG. 3) can be mounted within slot 96 to support paddle arm 76 against a user's arm. Notched portion 98 is composed of flexible material to enable flexure of the paddle arm when the wrist is bent, particularly in the plane orthogonal to the paddle wheel. As shown in FIG. 6A, paddle arm 76 and encoder wheel 80 are precisely aligned by mounting to holding brackets 86 and 88. "Egg" covers 90, 92 provide a housing for the entire assembly. Egg cover 92 is used to perform an analogous function as base 26, i.e., to retain sensor assembly 42 or 44 with respect to the glove 40. Thus, egg cover 92 is disposed on the inner surface of glove 40. Standoffs 98 pass through holes in the glove and fasten to housing 90 to retain the components in place.

It will be appreciated that other configurations can alternatively be employed for the sensor assemblies 42 and 44. For example, the configurations disclosed in copending U.S. patent application Ser. No. 593,216 (the '216 application), assigned to the assignee herein and incorporated herein by reference, may be suitable. Moreover, a linear encoder assembly, to be discussed below, may be utilized as an alternative to the encoder wheel configuration.

Figure 9:
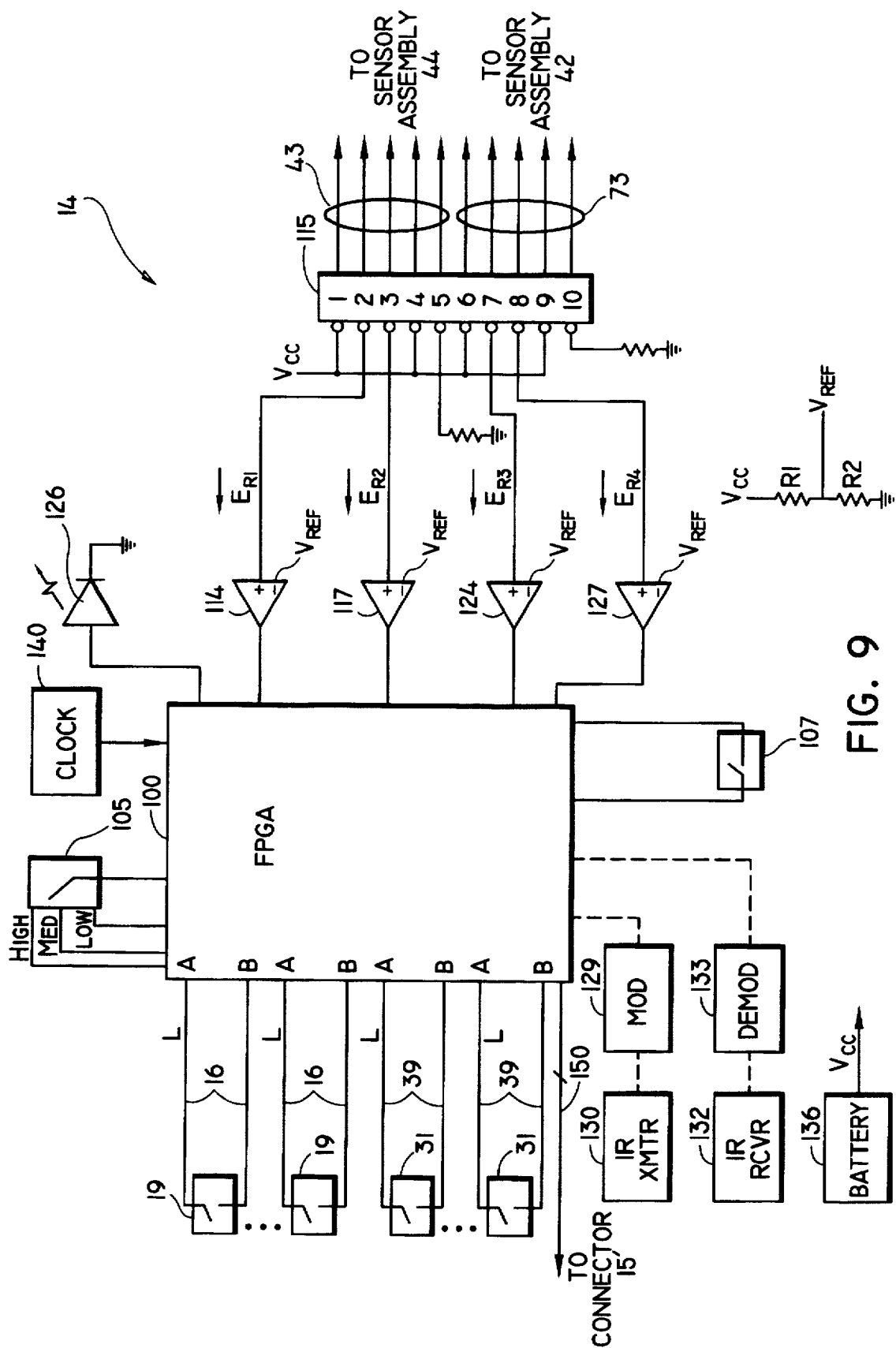
FIG. 9 is a schematic block diagram of electronic components within the hand attachment.

Turning now to FIG. 9, a block diagram of exemplary electronics of the main printed circuit board 14 is shown. A field programmable gate array (FPGA) 100 such as a Xilinx XC3030L is programmed to communicate command signals with the display interface, e.g. a game station such as the SONY PLAYstation™, or, a personal computer. Other integrated circuits such as a GA or a microprocessor may be used as an alternative to FPGA 100. In a wired embodiment, lines 150 are used to communicate the command signals as well as to bring operating voltage $V_{cc}$ to FPGA 100. This operating voltage is also brought to other components of PCB 14.

In a wireless embodiment, a battery 136 powers FPGA 100 as well as other components of PCB 14. Wireless communication is preferably via infrared (IR) wavelength using IR transmitter 130 and receiver 132, which may be mounted on the tip portion of one of finger members 17 (see FIG. 4). Radio frequency communication is also possible. A modulator 129 and demodulator 133 are employed to provide suitable wireless transmission and reception.

FPGA 100 provides a logic level voltage from one of ports A on one side of each finger contact switch 19 and to each thumb contact switch 31. Whenever any one of switches is closed by depression of an associated finger pad 21–24 or thumb pad 32, the switch activation is detected at the corresponding B port of FPGA 100. FPGA 100 then transmits a command signal to the game station associated with the particular switch 19 or 31 that is activated. The command signals associated with each switch are stored in memory within FPGA 100 and retrieved at appropriate times. Clock 140 facilitates synchronization of the command signals. The command signal is transmitted as long as the switch remains closed, and may command any of a variety of specific functions such as jumping or firing a weapon. Instead of simply providing a logic level at each switch 19 or 31 to detect switch activation, the actual command signal associated with the switch can be routed to the switch and then transmitted to the game station via lines 150 whenever the switch is closed.

Preferably, the thumb contact switches 31 are used for direction control of the video object to either supplement the directional commands associated with the sensor assemblies 42 and 44, or, to override the directional commands of the sensor assemblies. Any one of thumb switches 31 could also be dedicated for specific actions.

As discussed above, clockwise and counterclockwise rotation of the optical encoder wheel 80 of each sensor assembly 42, 44 can be detected by comparing the phases of the received waveforms from the respective phototransistors in each sensor assembly. As shown in FIG. 9, cables 43 and 73 connect sensor assemblies 44, 42 to connector 115 and bring supply voltage $V_{cc}$ to the sensor assemblies. Receive voltages $E_{R1}$ and $E_{R2}$ from the phototransistors within sensor assembly 44 are applied to the positive inputs of comparators 114 and 117, respectively. Comparators 114, 117 each compare the instantaneous voltage level of $E_{R1}$ or $E_{R2}$ to a reference voltage $V_{REF}$ derived from voltage division of supply voltage $V_{cc}$ by resistors R1 and R2. When $E_{R1}$ or $E_{R2}$ is above $V_{REF}$, this indicates that the corresponding phototransistor Q1 or Q2 is aligned with a portion of an aperture 84 of encoder wheel 80. Each comparator outputs a logic HIGH or LOW in correspondence with the receive voltage being higher or lower than $V_{REF}$, respectively. The comparator outputs are supplied to FPGA 100 which compares the changing states of the logic levels to determine whether clockwise or counterclockwise rotation of encoder wheel 80 is taking place. FPGA 100 also determines the relative position of encoder wheel 80 from a pre-established neutral position of the encoder wheel. Based on this determination, FPGA 100 transmits a command signal to the game station commanding the associated video object to either move in a corresponding direction or to remain stationary. The operation of comparators 124 and 127, which receive respective voltages $E_{R3}$ and $E_{R4}$ from the pair of phototransistors within the side-mounted sensor assembly 42, is analogous to that just described for comparators 114 and 117.

The neutral position can be established and adjusted by means of automatic centering switch 107. This switch is preferably actuated by depression of a corresponding finger pad protruding from the rear of bottom glove base assembly 12. Activation of switch 107 establishes a neutral point from which all control directions emanate. This allows for individual adjustment of a comfortable neutral position for each user. When FPGA 100 detects activation of switch 107, it resets an internal counter associated with the decoding of the received waveforms from the phototransistors. Following the resetting of the counter, any detected clockwise or counterclockwise rotation of the encoder wheel beyond the encoder wheel position corresponding to the neutral position, results in a command signal generated corresponding to the associated directional movement of the wrist. That is, once the counter is reset, a new count is generated for the number of received pulses in the clockwise or counterclockwise directions. For example, after the counter is reset, the count is set to zero and a neutral command signal is generated and transmitted to the game station to maintain the video object stationary in its current horizontal position. If the encoder wheel moves by one aperture 84 in a clockwise direction, the command signal for right movement of the video element is generated, and the count is updated to +1. If the wheel moves clockwise by an additional aperture, the count is updated to +2 and the right command is maintained. If the wheel then rotates one aperture counterclockwise, the count is decreased to +1 but the right direction command is maintained. Further counterclockwise rotation of one aperture decrements the count to zero, and the command signal is changed to a neutral direction signal in which there is no video element movement in the horizontal direction. Further counterclockwise movement of one aperture decreases the count to −1, resulting in a change in the command signal to control movement in the left direction. At this point, should the user again depress the automatic centering pad, the count will be reset at 0 and there is no movement of the video object unless the wheel rotates again.

The above-described operation of hand-attachment 10, wherein a "right" direction command is generated whenever the encoder wheel is in a position clockwise from the neutral zone, is essentially a "digital" embodiment in which the same right direction command is generated regardless of how far the rotation is from the neutral position. As an alternative, an "analog" approach can be implemented by modifying the software wherein the further the user moves away from the neutral zone, the more pronounced the corresponding motion of the remote object will be. For example, a video character can be caused to fun faster or slower, depending on the relative position away from the neutral zone. As such, proportional movement is produced in the analog approach. Yet another approach is a quasi analog-digital approach where proportional movement of the object is produced, as a function of the degree of hand movement, but in discrete steps. Thus, for example, if a user rotates his hand $X_1$ degrees clockwise, the character can run at speed $S_1$. This speed $S_1$ will be maintained until the user rotates his hand another $X_1$ degrees clockwise, whereupon the character will be caused to run at speed $S_2$, and so forth.

In yet another approach, i.e., a "proportional rate" approach, the rate at which the user causes rotation of the encoder wheel will cause a proportional movement of the object. The rate of rotation can be determined by means of FPGA 100 (or other processor) determining the pulsewidths of the alternating pulses due to rotation. Faster movement of the hand produces shorter pulsewidths.

As an option, additional switches can be employed on hand-attachment 10 to allow a user to switch to a desired mode of operation, i.e., either digital, analog, quasi digital/analog or "proportional rate" mode. These additional switches would be connected to FPGA 100. Activation of any of the switches sets the mode of operation within FPGA 100.

FGPA 100 also includes another counter ("vertical counter") dedicated for determining the rotational position of the encoder wheel within sensor assembly 44, to thereby determine the vertical position of the wrist relative to the neutral position. (As explained earlier, the "handshake" position is the preferred hand position for use of hand-attachment 10. As such, the vertical counter is preferably responsive to signals from the sensor assembly 42 or 44 mounted to the top of the hand. However, the hand-attachment could also be designed to be used in the position as depicted in FIG. 3). When the centering switch is activated by the user, a neutral position is established in the vertical direction by resetting the vertical counter to zero. A counting method analogous to that described above for horizontal movement is then carried out for vertical movement. Movement in the vertical direction may be implemented simultaneously with horizontal movement, thereby allowing diagonal movement of the video object. In this case, as the user moves his/her wrist diagonally, the screen icon will correspondingly move diagonally. In the alternative, the vertical and horizontal movement can be mutually exclusive, whereby only vertical or horizontal motion is allowed at any instance of time.

In addition to providing a neutral command signal when the encoder wheel is determined to be in the neutral position, FPGA 100 may also activate an indicator such as an audible tone or an LED 126 to alert the user that he/she is in the neutral position. LED 126 may be mounted on the upper housing of the top sensor assembly 42.

A mode switch 105 is employed to control the size of the neutral zone. This switch is preferably a three position switch, allowing LOW, MEDIUM and HIGH neutral zones, with the LOW zone being the least sensitive or widest zone and the HIGH zone being the most sensitive or most narrow zone. For instance, in the example above, once the centering switch 107 was activated, a movement of the encoder wheel 80 by only one aperture 84 resulted in a change in the direction command signal for that sensor assembly. This is exemplary of the node switch being in the HIGH sensitivity position. If the mode switch is switched to the MEDIUM sensitivity position, two or more apertures from the neutral point would need to be traversed in order for the direction command signal to change. Likewise, even further rotation would be required with the mode switch in the LOW sensitivity position. The counting procedure of the FPGA counter, wherein counts are always referenced to the neutral point established when the centering switch 107 was depressed, is the same regardless of the position of the mode switch. The mode switch position operates to vary the command signals as a function of the count. The mode switch may be activated by a lever or finger pad protruding from the inner surface of the bottom glove base 12. The mode switch can also be employed in embodiments of the present invention that do not employ an automatic centering switch, but which only use pre-established neutral positions for both the horizontal and vertical planes.

As an alternative to a three-position mode switch, a large number of selectable neutral zones could be implemented. For example, mode switch 105 could be embodied as a rotary dial, with corresponding circuitry included to provide a large number of neutral zones, to permit tighter adjustment by the user.

Hand attachment 10 may also include a resistive device which causes the user's wrist to return to a neutral position and lets the user know when he/she is out of a neutral position. The resistance may or may not be variable, depending on the extent to which the user is out of center. The resistive device can be employed with hand attachment 10 or other hand attachable controllers, whether or not the controller includes an automatic centering switch to dynamically set a neutral position as discussed above.

Figure 10C:
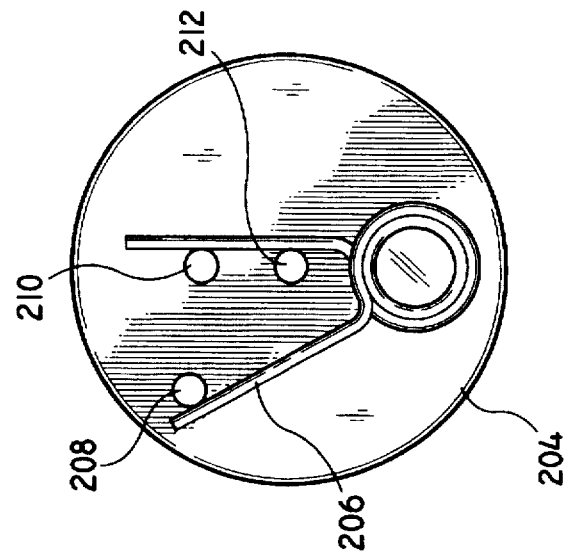
Figure 10B:
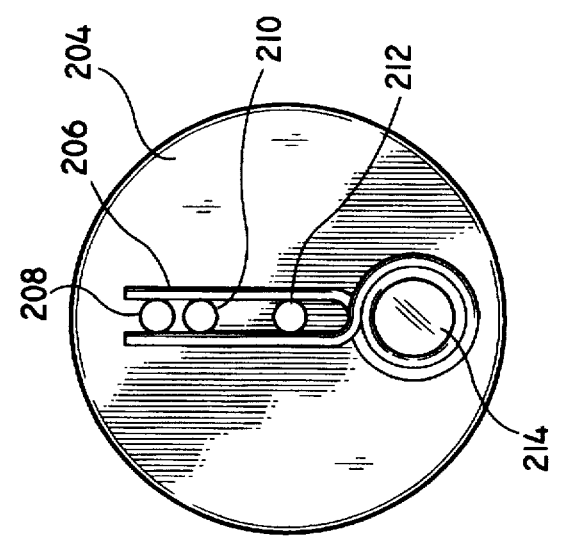
Figure 10A:
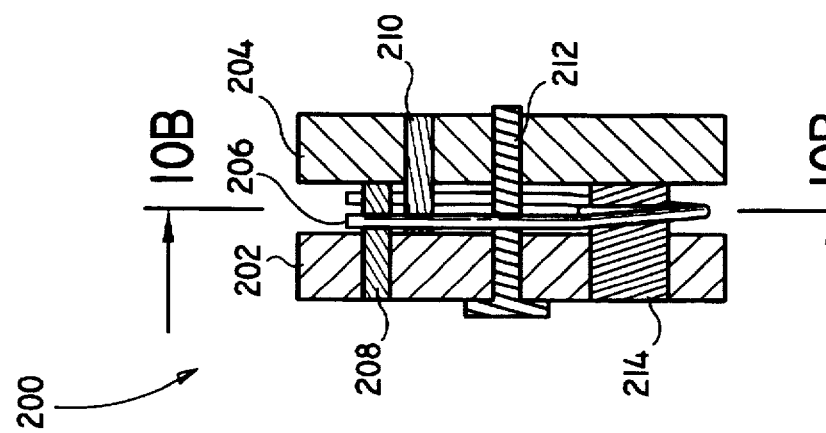

Referring now to FIGS. 10A–10C, a first embodiment of such a resistive device is illustrated, designated generally as 200. Device 200 includes a torsion spring 206 between a first plate 202 and a second plate 204. Two devices 200 are integrated with hand attachment 10, one mounted at a location on hand attachment 10 corresponding to the top or bottom of the user's wrist and the other corresponding to the side of the wrist. The device at the top or bottom of the wrist spring biases the wrist to a centralized horizontal position, whereas the side mounted device spring biases the wrist to a centralized vertical position. As shown in FIGS. 10A and 10B, pins 208 and 210 are pressed within plates 202 and 204, respectively. These pins are interposed between the legs of spring 206. Pin 212 holds the plates together by means of a press fit into plate 204 and a rotatable fit through the hole in the center of plate 202. Pin 212 may be used to mount device 200 to hand attachment 10. Pin 214 acts as an anchor for spring 206. As plates 202 and 204 are rotated with respect to one another by virtue of wrist movement, pins 208 and 210 force the deflection of spring 206. The force depends on the spring rate of spring 206. Once the spring is deflected, the user must maintain sufficient force deflecting the spring to avoid returning to the neutral position as a result of the spring's counter-force. Deflection of spring 206 is illustrated in FIG. 10C. It is noted that pins 208 and 210 may be molded as part of plates 202 and 204 if the spring force is sufficiently light and plastics of sufficient strength are used in the construction of the unit.

FIGS. 11A and 11B show sectional views of another resistive device 220, which is an alternative to the above-discussed resistive device 200. Device 220 includes a first plate 222 that rotates with respect to a second plate 224 as the user's wrist moves. A spring 226 wraps as a coil around a collar 228 within a cut-out of plate 222. Spring 226 performs the analogous function of spring 206, which is to bias the user's wrist towards a neutral position. However, being concentrically located, the effective length of spring 226 can be larger, thereby furnishing a lower spring constant than the design of spring 206. Pins 232–238 serve as bearing surfaces for spring 226. Two devices 220 are mounted to hand attachment 10, where one is side mounted and the other top or bottom mounted (as was the case for device 200) to permit a neutral position bias in two orthogonal planes. Mounting may be accomplished by means of plate 224 being affixed to, or integrally part of, side plate 34 or housing 12 (see FIG. 1). Direct mounting to glove fabric 40 is also possible.

In operation, wrist motion of the user causes plates 222 and 224 rotate from their original positions, causing spring end 226a to move towards spring end 226b in direction A. Consequently, spring 226 is tensioned into a more stressed position, imparting a slight tactile force to the user. Release of torque on the plates causes spring 26 to return the mechanism to the original, at rest position. Since resistive device 220 employs a longer effective spring 226 than the spring 206 of device 200, the rate of the spring is lowered while still providing a usable "feel" for the overall unit. Spring 226 also serves as a means for forming stops to limit the angle of movement of plates 222 and 224 with respect to one another. The distance between the stops corresponds to the arc between the spring ends 226a and 226b in the least tensioned position as depicted in FIG. 11B. The ends of spring 226 are formed to include a right angle therein. The angle formed in the ends of spring 226 prevent the ends from receding into a slot between plates 222 and 224.

Figure 12A:
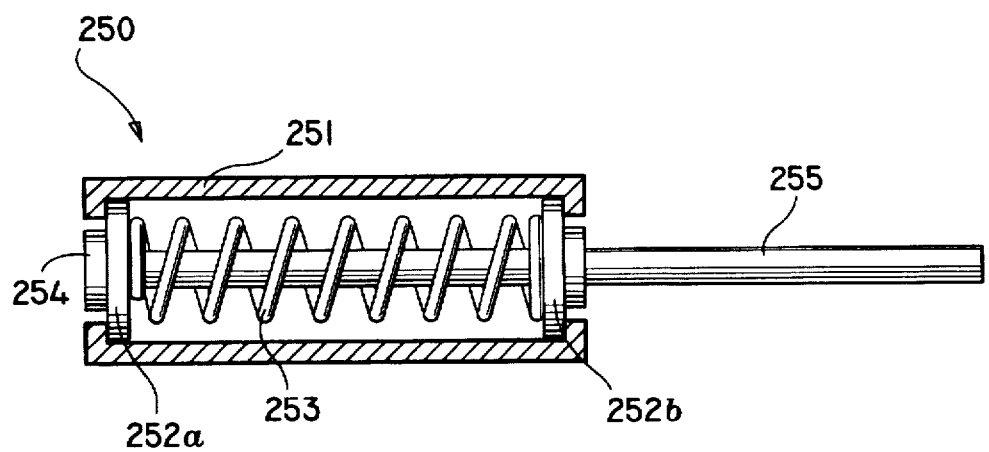
Figure 12B:
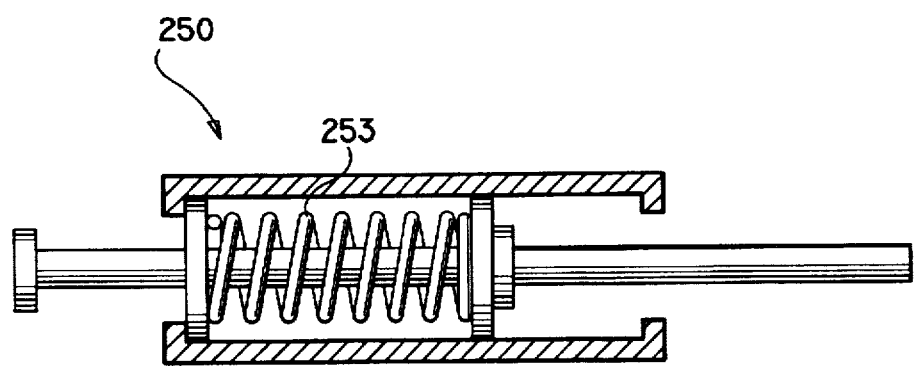
Figure 12C:
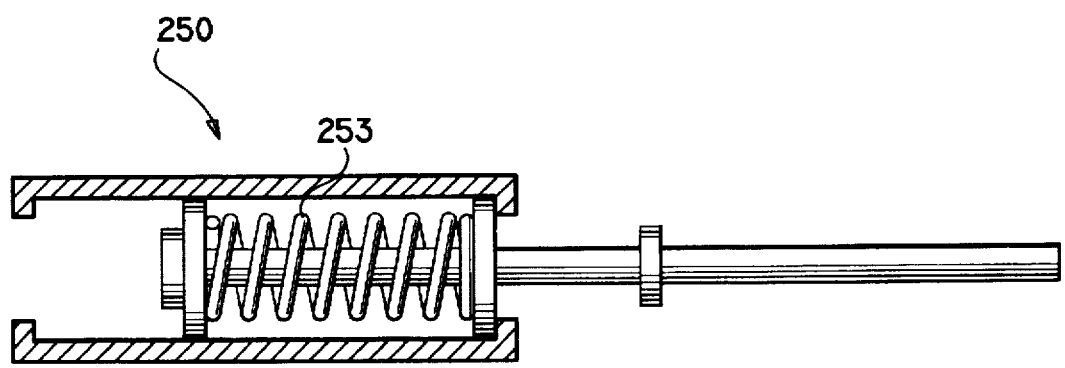

Yet another embodiment of a resistive device to provide tactile feedback to the user on the location of the neutral position is shown in FIGS. 12A to 12C. Spring mechanism 250 includes a compression spring 253, a pair of bushings 252a and 252b, a plunger 254 and an outer sleeve 251. Bushings 252a, 252b allow for smooth linear motion of plunger 254 relative to outer sleeve 251. A neutral position of mechanism 250 is shown in FIG. 12A. Linear displacement of plunger 254 relative to outer sleeve 251 in either direction, as shown in FIGS. 12B and 12C, compresses spring 253. The compressed spring exerts a force which attempts to restore the mechanism to the neutral position. It is noted that compression spring 253 could alternatively be made up of two springs, in which case the neutral position would be at the center of outer sleeve 251. The two springs would be compression springs mounted on either side of plunger 254 inside sleeve 251.

Spring mechanism 250 attaches to the user's forearm and hand such that it bridges the wrist joint. For instance, outer sleeve 251 can be attached to the top or side of the user's hand, and the end of plunger 255 attached to the top or side of the user's forearm. When the mechanism is in the neutral position, the user will not feel any force on his/her wrist. Bending of the wrist joint will move outer sleeve 251 relative to plunger 255, resulting in a force on the user's wrist which will tend to restore it to the neutral position. Two spring mechanisms 250, one mounted on the side of the hand and the other mounted on the top of the hand, would provide feedback on the neutral position for any direction of wrist motion.

Figure 13:
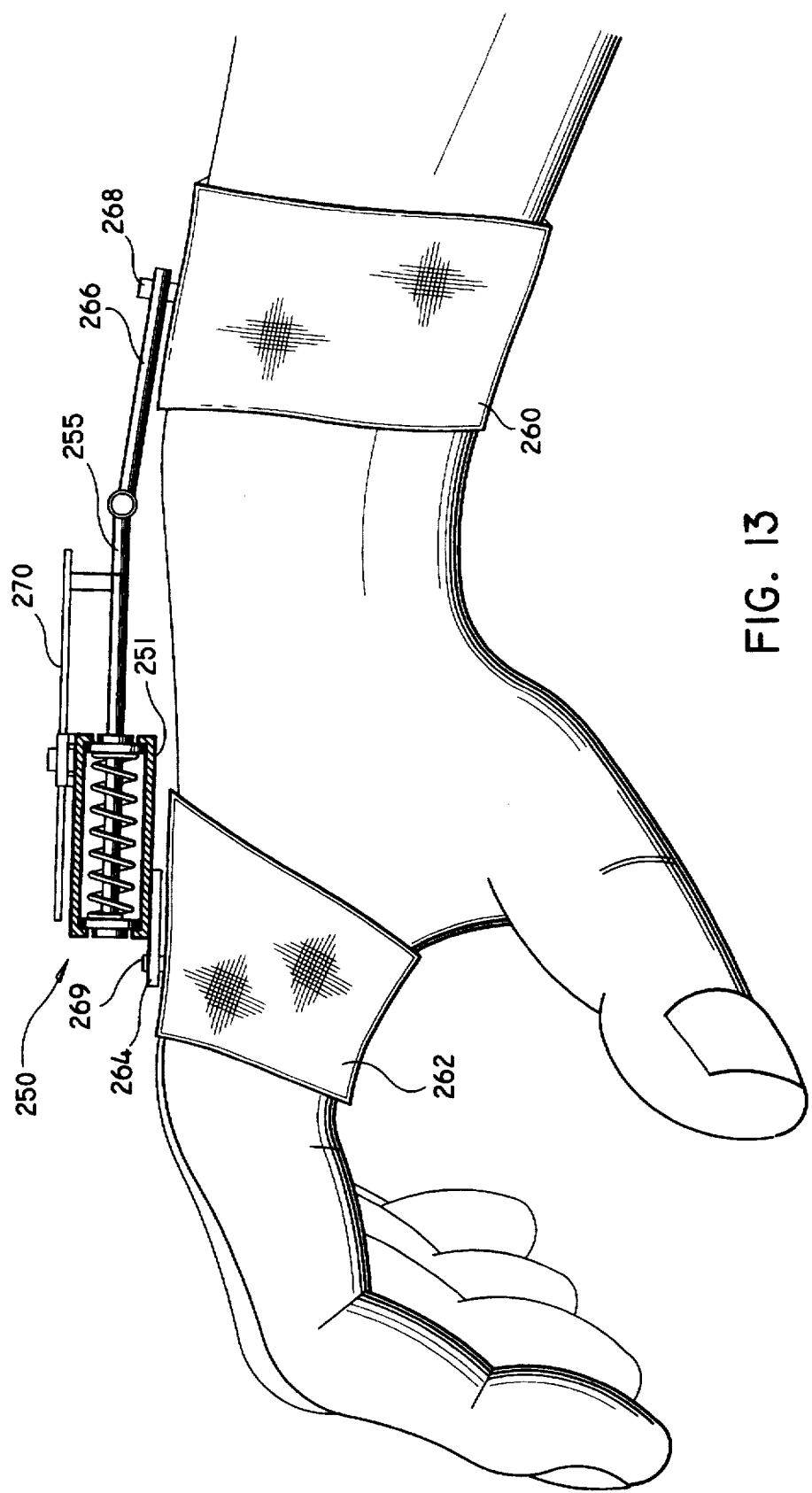
FIG. 13 illustrates a resistive device integrated with a linear encoder.
Figure 14:
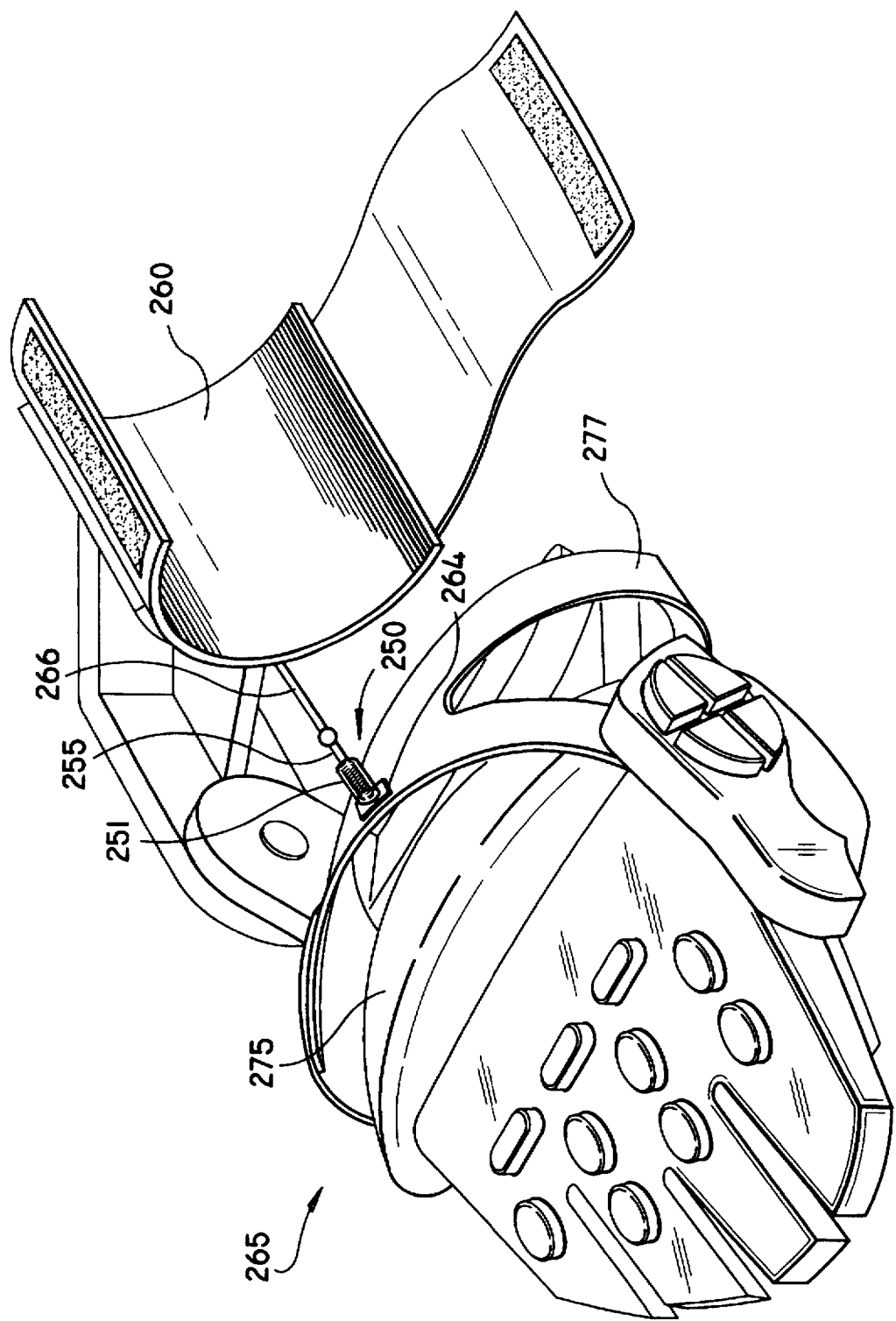
FIG. 14 shows a resistive device integrated with a hand-attachable controller.

One method of integrating spring mechanism 250 with a hand-attachable controller is illustrated in FIGS. 13–14. Referring to FIG. 13, spring mechanism 250 is shown mounted to the top of a user's hand. Outer sleeve 251 is mounted to a wrist strap 262 by means of bracket 264 and pivot 269. Plunger shaft 255 is affixed to a flexible or hinged section 266 to prevent interference with wrist motion.

Hinged section 266 is mounted to cuff strap 260 via pivot 268. Pivots 268 and 269 are necessary to permit full freedom of wrist motion. Also attached to outer sleeve 251 and plunger shaft 255 is an optional linear optical encoder assembly 270 which may be used as an alternative to the sensor assemblies 42, 44 discussed above. Cuff strap 260 and wrist strap 262 can be integrated together to form an embodiment of glove 40, which is attached to glove base assembly 11 to form another embodiment of hand-attachment 10.

Referring to FIG. 14, spring mechanism 250 is shown mounted to a hand attachment 265. Hand attachment 265 performs the same functions as hand attachment 10 discussed above. One difference is that the fingerless glove is replaced by Y-strap 277 and forearm or wrist cuff 260 to attach the user's hand to hand-attachment 265. The user's palm is supported by base 275. Hand attachment 265 is described in more detail in copending U.S. patent application Ser. No. 08/798,291, entitled ERGONOMIC HAND-ATTACHABLE CONTROLLER, filed on Feb. 7, 1997, and assigned to the assignee herein, the subject matter of which is incorporated herein by reference. Spring mechanism 250 is shown in FIG. 14 without being integrated with linear encoder 270 (although linear encoder 270 can optionally be included). Housing 251 is mounted to the top portion of Y-strap 277 by attachment to flange 264, which is pivotally attached to Y-strap 277. Hinged section 266 is pivotally connected to the top portion of cuff 260. Another spring mechanism 250 can be similarly be attached to a side portion of hand attachment 265.

Figure 15:
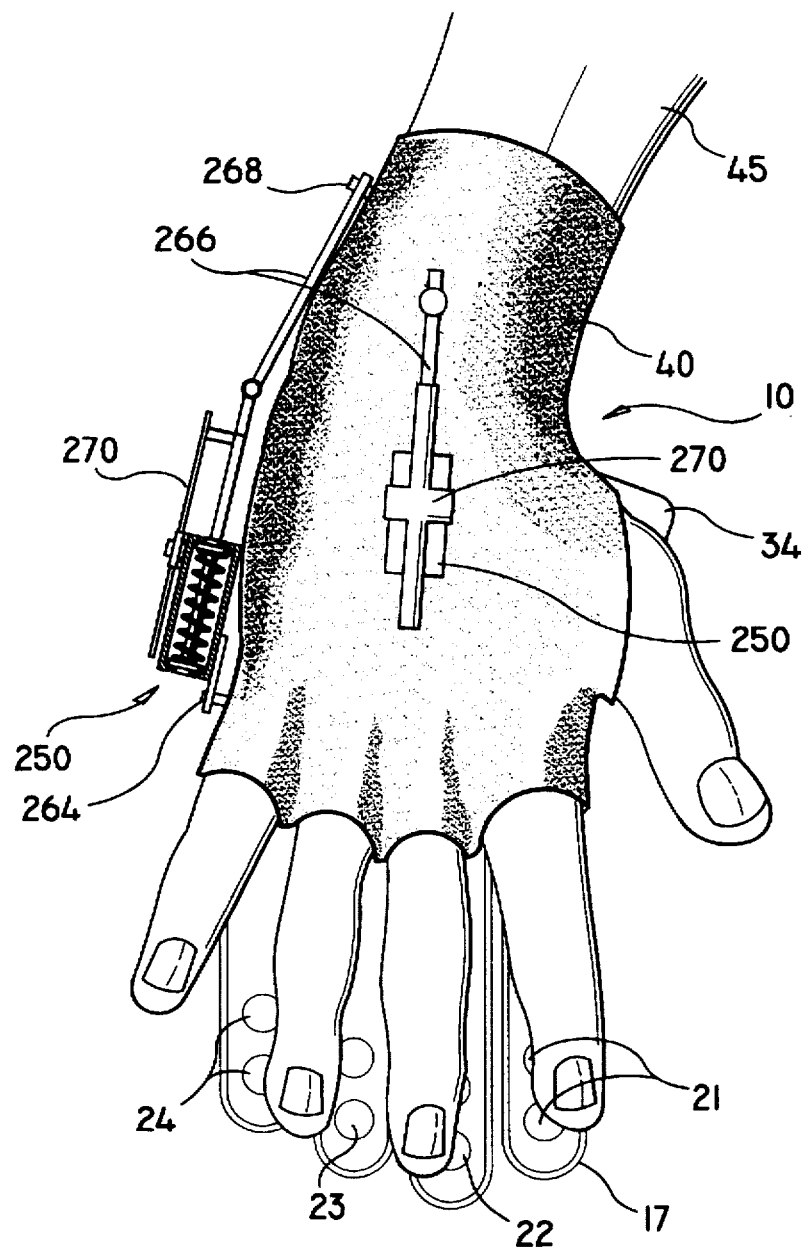
FIG. 15 illustrates a resistive device/linear encoder assembly integrated with a hand-attachable controller, as worn by a user.

With reference now to FIG. 15, two spring mechanisms 250 are shown integrated with hand-attachment 10, one side-mounted and the other top-mounted. In the shown embodiment, a linear encoder assembly 270 is attached to each spring mechanism 250. As such, the two assemblies replace sensor assemblies 42, 44 described above (see FIG. 3). Spring mechanisms 250 are each mounted to support flanges (not shown) attached to inner surfaces of the glove 40 fabric. In the alternative, spring mechanisms 250 may be mounted to the glove fabric itself. In either case, each spring mechanism is pivotally attached by means of pivots 268, 269 and flange 264 (attached to sleeve 251). Insulated conductors (not shown) connect each linear encoder 270 to the electronics within glove base assembly 11.

FIGS. 16A and 16B are plan and side views, respectively, of an exemplary linear encoder 270. As mentioned above, a linear encoder may be used as an alternative to the encoder wheels in sensor assemblies 42, 44 described above. Linear encoder 270 provides a means for measuring the degree to which a user's wrist joint is bent. Up/down movement (or flexion/extension) of the wrist joint results in a change in the linear distance between a fixed point on the top of a person's hand and a fixed point on his/her forearm. Similarly, left/right movement of the wrist joint results in a change in the distance between points on the side of the hand and forearm. The linear encoder measures this distance change in order to determine the degree to which a person's wrist is bent. Linear encoder 270 is comprised of a rectangular member or "comb" 281, e.g., sheet metal, with a large number of transparent windows 280 along its length. A housing 287 has a slot that allows comb 281 to slide relative to the housing. Housing 287 also has top and bottom openings to permit light from an LED 284 to be incident upon a receiver 286 such as a dual phototransistor when one of windows 280 is aligned therebetween. Translation of comb 281 through housing 287 results in the light from LED 284 being alternately blocked and transmitted by the windows 280 in comb 281. The relative positions of comb 281 and housing 287 can then be determined in the same manner discussed above for the rotary encoder. For example, quadrature encoding may be used in an analogous fashion as was discussed above in conjunction with the encoder wheels.

When linear encoder 270 is attached to the user's hand and forearm as shown in FIGS. 13 or 15 (i.e., with housing 287 attached to a point on the user's hand and comb 281 attached to a point on the user's forearm) motion of the wrist joint results in translation of comb 281 relative to housing 287. Measurement of this translation permits a determination of the degree to which the user's wrist is bent. In the illustrative embodiments, wire harness 291 electrically connects LED 284 and receiver 286 to the processor on PCB 14 within the glove base assembly. The processor decodes the pulse trains received by receiver 286 to determine the position of the wrist and the corresponding directional command to forward to the game station or computer.

Figure 17A:
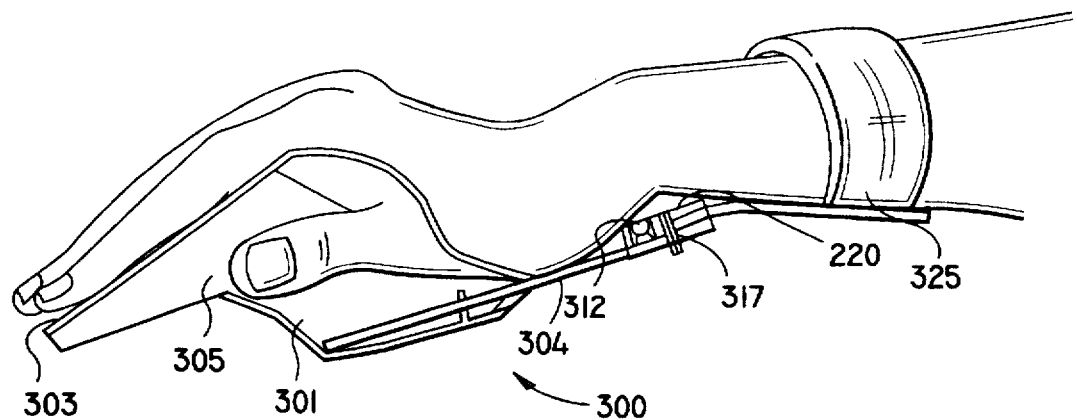
Figure 17B:
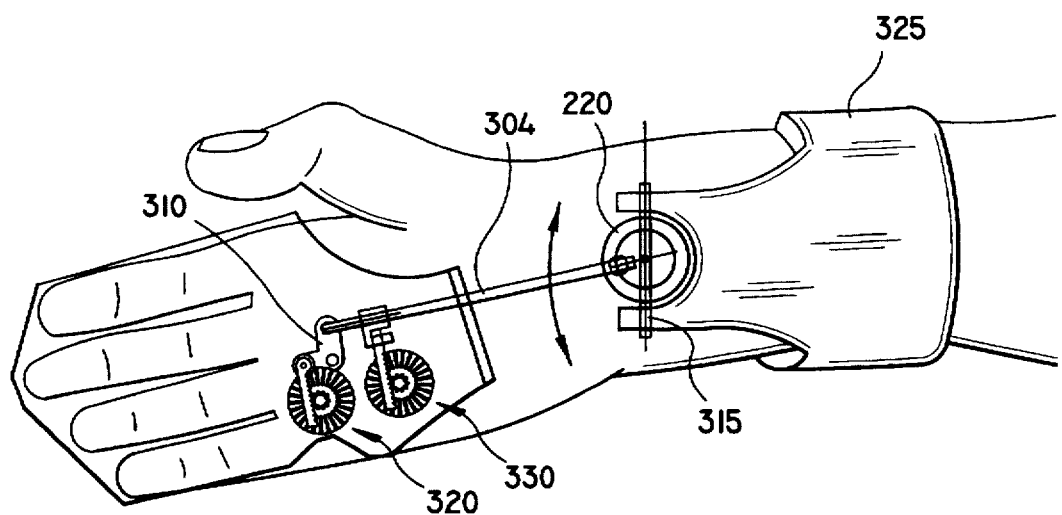

Referring now to FIGS. 17A–17B, another embodiment of a hand-attachable controller in accordance with the present invention is shown, designated as 300. Advantageously, controller 300 includes a pair of encoders within a single housing, where each encoder is dedicated for sensing hand movement relative to the forearm in one of two orthogonal planes. Controller 300 includes a base 301 which houses electronics in a hollow interior thereof, similar to the electronics within hand-attachable controller 10 discussed above. The electronics functions to transmit control commands to an external game station or the like to control movement of video or other remote objects in correspondence with hand movement. Finger pads may be included on top surface 303 and thumb pads on side surface 305 for depression by the user to produce specific movements of the remote object. Controller 300 is attachable to the user by means of collar 325 worn on the forearm and a hand fastener (not shown) for securing the hand. The hand fastener may be similar to the Y-strap 277 described above in connection with FIG. 14.

Sensing of vertical and horizontal hand movement with respect to the forearm is accomplished with a pair of encoders 320 and 330 housed within base support 301. Encoder 330 senses vertical movement whereas encoder 320 senses horizontal movement. As seen more clearly in FIG. 17C, each encoder 320, 330 includes an encoder wheel 326 with a pinion 328 centrally affixed thereto, a rack 324 engaging the pinion, an LED and dual phototransistor (both not shown) disposed in proximity to one another on opposing sides of the encoder wheel 326 peripheral apertures.

A link 304 extends from the base support 301 and is supported in relation to collar 325 by means of a plate assembly 220 and a pair of pins 315 and 317. Plate assembly 220 includes a resistant spring as discussed earlier; however, a disk without a spring can alternatively be used for plate 220 in the embodiment of FIGS. 17. As shown in FIG. 17C, link 304 is a mechanically continuous rod having as one embodiment a cylindrical cross-section on one end and a square cross-section 334 on the other end. The square cross section serves as means for transmitting rotational movement of link 304 to link 335 even under conditions where link 304 is moving back and forth in the direction of the axis of link 304. The other end of square tube 334 is fixedly connected via post 321 to a bellcrank 310 within the interior of base 301, the bellcrank having arcuate movement as post 321 is moved back and forth by link 304. When the user's hand is moved horizontally (left/right) with respect to the forearm, link 304 slides in and out in the directions shown by the double-headed arrow B. As such, square tube 334 exhibits in-out movement, causing rotation of bellcrank 310, in turn producing translational movement of rack 324. The teeth of rack 324 engage teeth of pinion 328, thereby rotating the pinion and an optical encoder wheel 326 affixed to pinion 328. The LED and dual phototransistor sense encoder wheel rotation in a manner analogous to that discussed above.

Link 304 terminates in a ball joint 360. Extending from the distal end of link 304 is a short post 313 with a ball 312 at the end of the post (see FIG. 17D). The ball sits within a slot 332 of plate 314. The arrangement of plate 220 and pins 315, 317 in conjunction with the shape of slot 332 is such as to cause rotation of link 304 when the hand moves vertically with respect to the forearm. Rotation of link 304 occurs as plate 314 tilts slightly, thereby forcing ball 312 to move translationally within slot 332 with respect to link 304, and thus rotating link 304. Link 335, rack 324 as tube portion 334 rotates. Consequently, encoder wheel 326 is rotated and electrical signals corresponding to the user's vertical movement are transmitted to the processor within base 301.

Figure 18:
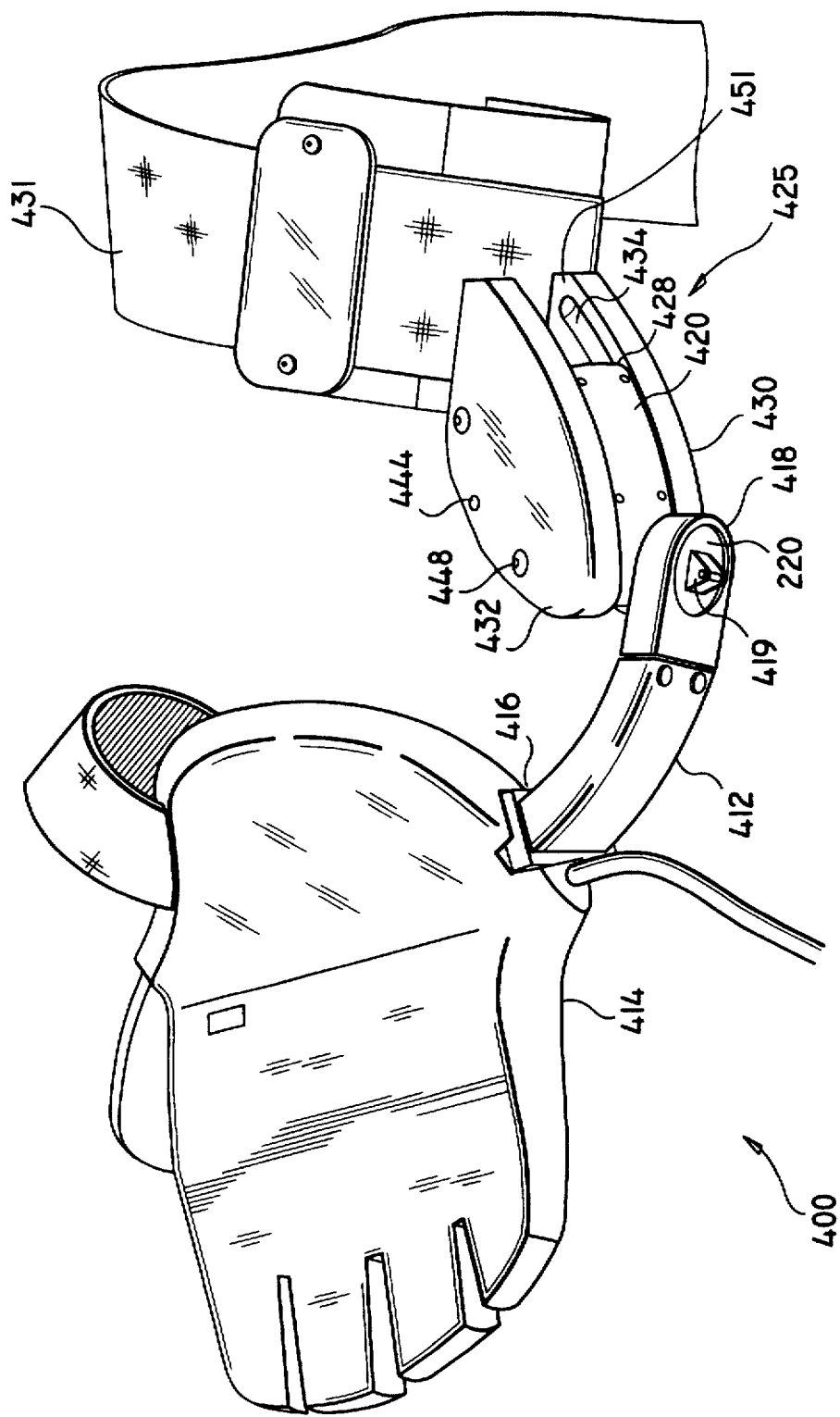
FIG. 18 is a perspective view of an alternate embodiment of a hand-attachable controller.
Figure 19:
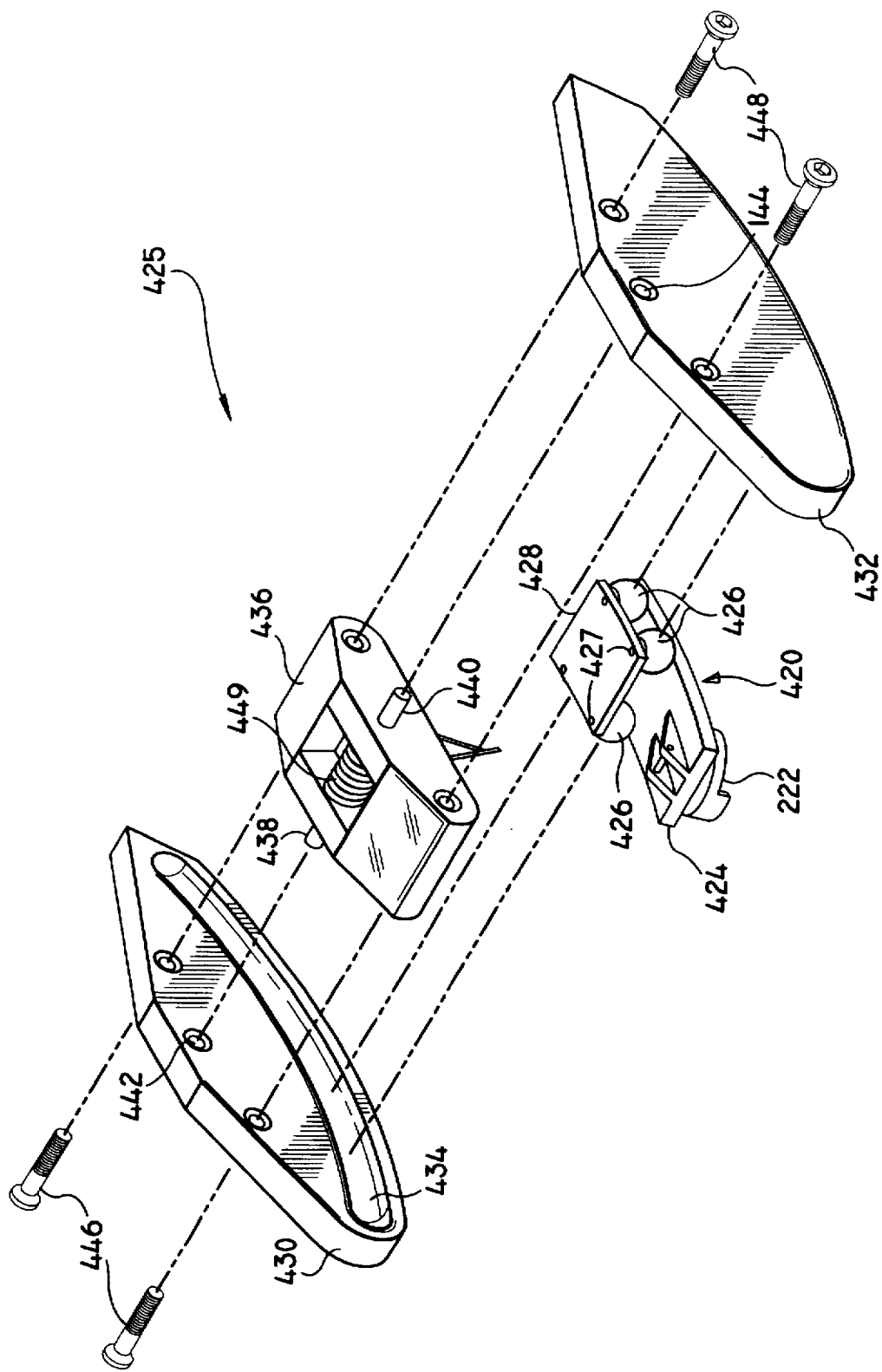
FIGS. 19–22 are views illustrating exemplary components of the controller of FIG. 18.

FIG. 18 is a perspective view of a hand-attachable controller 400, which is another embodiment of the present invention. Advantageously, the construction of controller 400 permits users of varying hand sizes to comfortably operate it. Controller 400 includes a base assembly or housing 414 which houses electronics similar to those of controller 10 for controlling movement of a remote object such as a video element. Within the interior of housing 414 resides a pair of optical encoders for sensing hand movement relative to the forearm in orthogonal planes. A side arm 412 extends outwardly from housing 414. A distal end 418 of side arm 412 is rotatably engaged with an assembly 425 by means of pivot 419. Assembly 425 is affixed to a strap 431 designed to strap around the user's forearm. As shown in the exploded view of FIG. 19, assembly 425 includes a subassembly 420 with the above-described resistive device 220 mounted on a first end 424. (Only plate 222 of device 220 is shown in the view of FIG. 19). Subassembly 420 is rotatably engaged with the distal end 418 of side arm 412. As such, side arm 412 rotates with respect to assembly 425 when the user moves his/her wrist horizontally (with housing 414 oriented in the handshake position). Resistive device 220 functions to provide tactile feedback to the user on the position of the wrist relative to a neutral position in the horizontal (left/right) plane with housing 414 held in the handshake position. The plates 222 and 224 rotate with respect to one another as the wrist is moved horizontally.

Balls 426 are mounted on edges of subassembly 420 adjacent a second end 428 of subassembly 420. The balls rotate around fixed shafts 427. Subassembly 420 is slidably engaged between side plates 430 and 432, each of which have an arch shaped groove 434 therein for slidable engagement with balls 426. The balls 426 slide within groove 434 when the wrist moves vertically. A frame member 436 is positioned between side plates 430 and 432 in juxtaposition with subassembly 420. A spring 449 is mounted within frame member 436. Spring 449 functions as a resistive device that provides tactile feedback to a user in the vertical plane on a position of the wrist relative to a neutral position in the vertical plane. Pins 438 and 440 extend perpendicularly from frame member 436. Side plates 430 and 432 have holes 442 and 444 therein for insertably receiving pins 438 and 440. Fasteners 446 and 448 are provided to attach side plates 430 and 432 to frame member 436.

Figure 20:
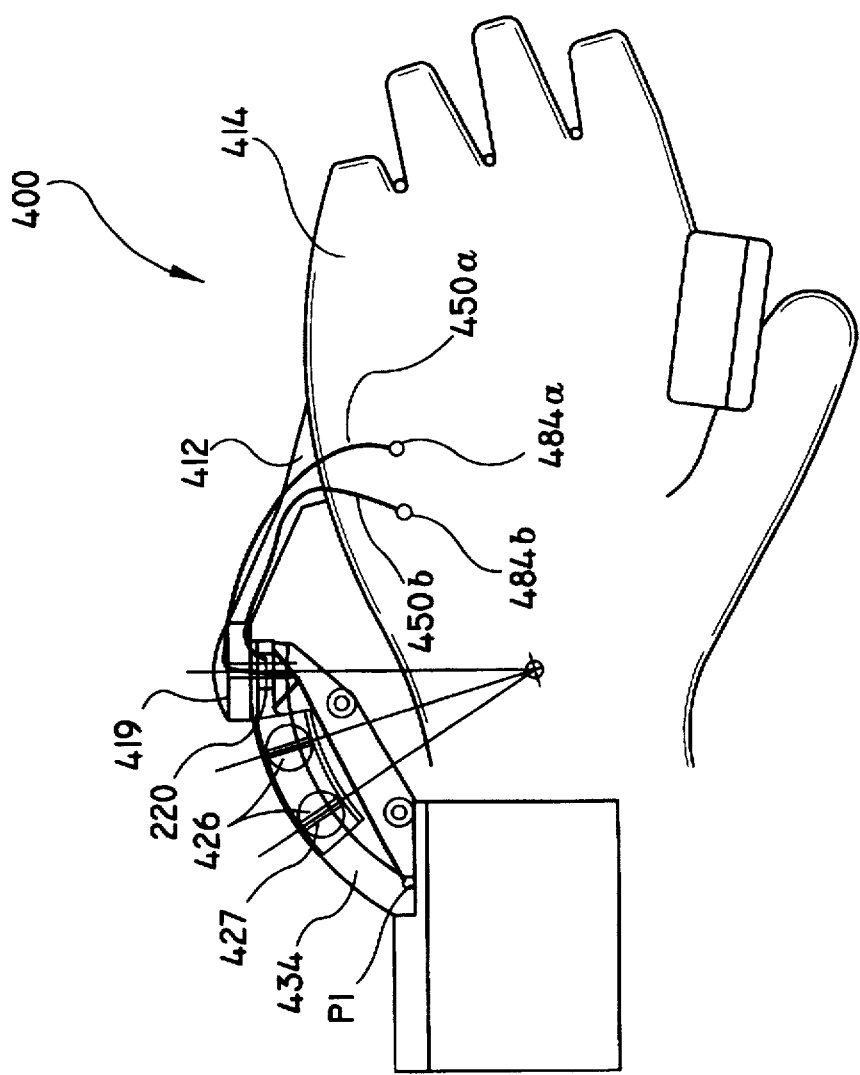

FIG. 20 shows a partial sectional view of controller 400, illustrating filaments 450a and 450b, each functioning to implement rotation of an associated optical encoder wheel within the interior of base 414. Filament 450a runs through the left/right pivot 419 and is anchored to a fixed point P within groove 434. The other end of filament 450a runs through side arm 412 into the interior of base 414 and attaches to an attachment point 484a. Movement of filament 450a causes rotation of an up/down optical encoder wheel within base 414. By running filament 450a through the left/right pivot 419, cross-talk with left/right movement is reduced or eliminated. In other words, left/right movement will produce zero or minimal rotation of the up/down encoder wheel. Filament 484b is associated with left/right movement and is attached on one end to a fixed point on resistive device 220. The other end of filament 450b is attached to attachment point 484b of a left/right sector gear within housing 414.

Figure 21:
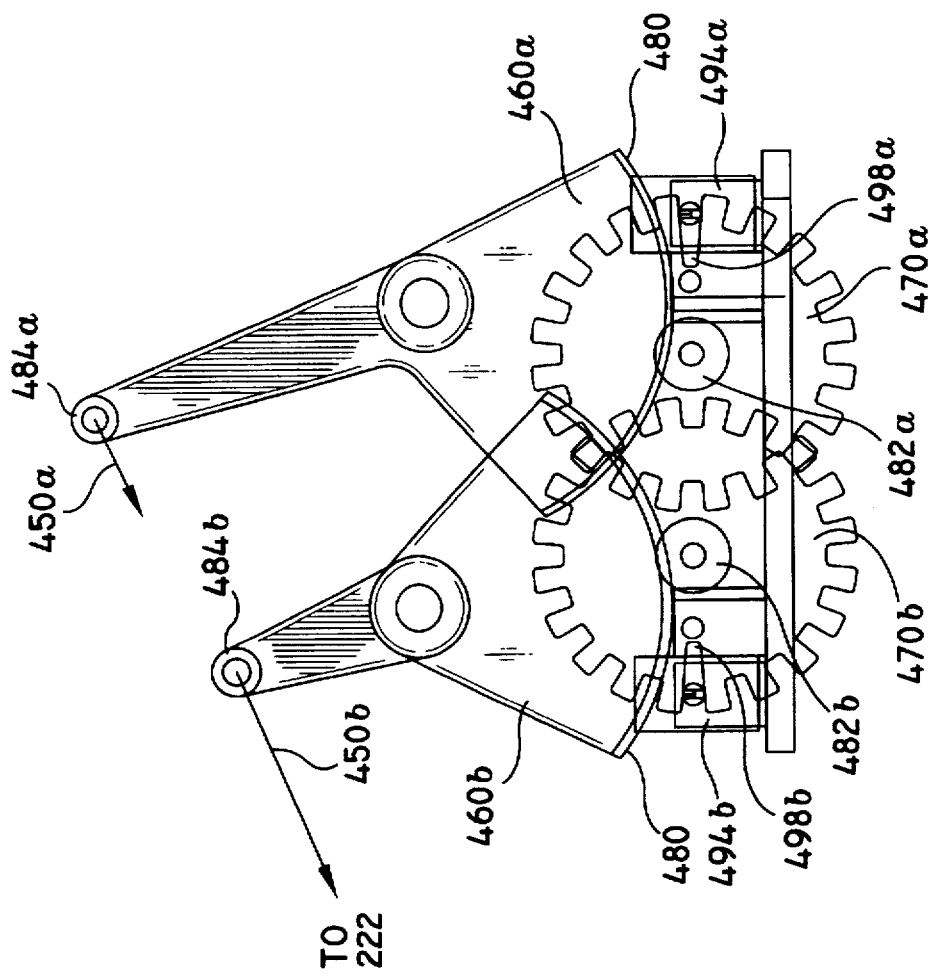

Referring to FIG. 21, filament 450a attaches to attachment point 484a of up/down sector gear 460a. Sector gear 460a is spring loaded. As such, varying tension of filament 450a, which is caused by vertical movement of the user's wrist, rotates sector gear 460a. Teeth 480 of sector gear 460a engage teeth of pinion 482a affixed to encoder wheel 470a. Hence, rotation of sector gear 460a produces rotation of encoder wheel 470a. Likewise, filament 450b attaches to point 484b of sector gear 470b, and causes rotation of sector gear 460b when the user moves his/her wrist horizontally. Encoder wheel 470b thus rotates and corresponding electrical signals are transmitted to the processor.

Figure 22:
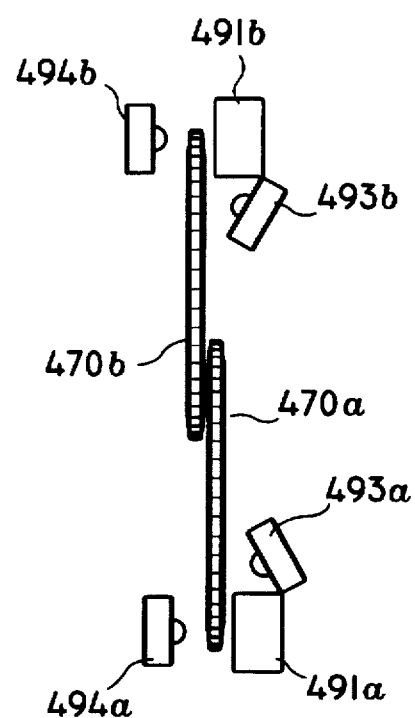

Encoder wheel 470a may have an elongated slot 498a (analogous to the elongated aperture 84a of FIG. 8A discussed above). As shown in FIG. 22, an LED 494a is disposed adjacent dual phototransistor package 491a in a quadrature encoding arrangement as discussed earlier. Zeroing photodetector 493a receives sufficient light only when slot 498a is aligned between detector 493a and LED 494a. When detector 493a receives sufficient light, the counters of FPGA 100 (or microprocessor, etc.) are reset. As such, a centering switch (as switch 107 of FIG. 9) or additional LED to detect the center position can be optionally avoided. Encoder wheel 460b has an analogous slot 498b used in conjunction with LED 494b an detector 493b in an analogous manner.

It will be understood that the embodiments disclosed herein are merely exemplary and that one skilled in the art can make many variations and modifications to the disclosed embodiments without departing from the spirit and scope of the invention. All such variations and modifications are intended to be included within the scope of the invention as defined by the appended claims.

What is claimed is:

1. A hand attachment for providing command signals to control movement of at least one object responsive to hand movement, comprising:

a glove base assembly having an upper surface including a palm surface and a finger surface, said finger surface including a plurality of finger pads for depression by a finger of a user wearing the hand attachment to cause a specific movement of said at least one object;

a glove attached to said glove base assembly, wherein at least a portion of said glove overlays said palm surface;

at least one sensing device for detecting directional movement of the user's hand relative to the user's arm; and circuit means for converting the detected directional movement to command signals for controlling the movement of said at least one object in directions corresponding to the hand movement.

2. The hand attachment of claim 1, wherein said glove is composed of fabric and is attached to said palm surface.

3. The hand attachment of claim 1, wherein said at least one object comprises a video element on a video display.

4. The hand attachment of claim 1, wherein said glove is finger-less.

5. The hand attachment of claim 1, wherein said finger surface and said palm surface define an angle in the range of about 100 to 140 degrees.

6. The hand attachment of claim 1, wherein said finger surface is defined by four planar finger members and said finger pads, each of said finger members separated from one another and each having at least one aperture for receiving an associated finger pad.

7. The hand attachment of claim 1, wherein said sensing device comprises an optical sensor.

8. The hand attachment of claim 1, further comprising an automatic centering switch coupled to said circuit means, wherein activation of said switch enables said circuit means to establish a neutral position as a current relative position of a user's hand as sensed by said at least one sensing device, such that all control directions are referenced to said neutral position.

9. The hand attachment of claim 1, further comprising an indicator coupled to said at least one sensing device for indicating when a user's relative hand position is in a neutral position from which all control directions are referenced.

10. The hand attachment of claim 1, further comprising a mode switch coupled to said circuit means for enabling the sensitivity of object movement as a function of hand movement to be varied.

11. The hand attachment of claim 1, wherein said palm surface includes a centralized arch to enhance support of a user's palm.

12. The hand attachment of claim 1, wherein said palm surface includes a ridge corresponding only to said index, middle and ring fingers to facilitate access of at least one of said finger pads by a pinky of the user.

13. The hand attachment of claim 1, wherein said at least one sensing device is attached to said glove.

14. The hand attachment of claim 13, wherein said at least one sensing device comprises a first sensing device attached to a top portion of said glove for sensing movement of the user's hand in a first plane, and a second sensing device attached to a side portion of said glove for sensing movement of the user's hand in a second plane orthogonal to the first plane.

15. The hand attachment of claim 1, further comprising at least one thumb pad disposed on a side surface of said glove base assembly for depression by a user's thumb to cause a specific movement or action of said object.

16. The hand attachment of claim 15, wherein said specific movement of the object caused by depression of said at least one thumb pad is in a direction identical to a directional movement being sensed by one of said at least one sensing device.

17. The hand attachment of claim 1, further comprising a glove base support fastened within said glove for supporting a user's palm.

18. The hand attachment of claim 17, wherein said glove base support includes a centralized dome to enhance support of a user's palm.

19. The hand attachment of claim 1, wherein said circuit means for converting the detected directional movement to command signals includes a field programmable gate array (FGPA), said FPGA further coupled to said finger pads and operative to provide command signals indicative of which of said finger pads is depressed.

20. The hand attachment of claim 19, wherein said glove base assembly comprises:

- a top glove base defining said palm surface and a portion of said finger surface, said top glove base having a plurality of apertures through which a corresponding plurality of said finger pads protrude, said finger pads defining the remaining portion of said finger surface;
- a bottom glove base affixed to said top glove base;
- at least one finger printed circuit board disposed between said top and bottom glove bases, underlaying said finger surface and having switch contacts thereon corresponding to said finger pads;
- a thumb printed circuit board attached to a side portion of said bottom glove base and having at least one switch contact;
- at least one thumb pad affixed to said bottom glove base, disposed adjacent to said at least one switch contact of said thumb printed circuit board; and
- a main printed circuit board between said top and bottom glove base assemblies, coupled to each of said switch contacts, to said at least one sensing device and to an electrical connector that interfaces with an external display interface, said main printed circuit board including said FPGA.

* * * * *